US012731548B2

(12) United States Patent
Ito

(10) Patent No.: US 12,731,548 B2
(45) Date of Patent: Sep. 8, 2026

(54) DISPLAY DEVICE WHOSE DUTY RATIO IN SUB-FRAME PERIOD IS CONTROLLED

(71) Applicant: CANON KABUSHIKI KAISHA, Tokyo (JP)

(72) Inventor: Yota Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 19/069,630

(22) Filed: Mar. 4, 2025

(65) Prior Publication Data

US 2025/0292735 A1 Sep. 18, 2025

(30) Foreign Application Priority Data

Mar. 14, 2024 (JP) ................................ 2024-040190

(51) Int. Cl.
*G09G 3/3258* (2016.01)

(52) U.S. Cl.
CPC ..... *G09G 3/3258* (2013.01); *G09G 2320/045* (2013.01); *G09G 2320/0626* (2013.01); *G09G 2340/0435* (2013.01); *G09G 2354/00* (2013.01); *G09G 2360/145* (2013.01)

(58) Field of Classification Search
CPC ........... G09G 2320/064; G09G 3/3233; G09G 3/2022
See application file for complete search history.

(56) References Cited

U.S. PATENT DOCUMENTS

| | | | | |
|---|---|---|---|---|
| 10,574,946 | B2 | 2/2020 | Ishii | |
| 11,405,595 | B2 | 8/2022 | Ishii | |
| 11,436,988 | B2 | 9/2022 | Ishii | |
| 11,615,740 | B1 * | 3/2023 | Choi | G09G 3/3225 345/691 |
| 11,705,077 | B2 | 7/2023 | Ishii | |
| 12,106,725 | B2 | 10/2024 | Ishii | |
| 12,131,696 | B2 * | 10/2024 | Lee | G09G 3/3233 |
| 2009/0146934 | A1 * | 6/2009 | Hong | G09G 3/3648 345/87 |
| 2010/0141646 | A1 * | 6/2010 | Tanabe | G09G 3/3258 345/76 |
| 2015/0172528 | A1 * | 6/2015 | Maeyama | H04N 25/589 348/362 |
| 2019/0014292 | A1 | 1/2019 | Ishii | |
| 2019/0197967 | A1 * | 6/2019 | Moriyama | G03B 21/14 |
| 2020/0162704 | A1 | 5/2020 | Ishii | |
| 2021/0142742 | A1 | 5/2021 | Ishii | |
| 2022/0375419 | A1 | 11/2022 | Ishii | |

(Continued)

FOREIGN PATENT DOCUMENTS

| | | |
|---|---|---|
| JP | 2006-030516 A | 2/2006 |
| JP | 2011-141412 A | 7/2011 |

(Continued)

*Primary Examiner* — Van N Chow
(74) *Attorney, Agent, or Firm* — Venable LLP

(57) ABSTRACT

A display device includes a pixel array, a driver configured to drive the pixel array, and a controller configured to control the driver. The controller controls the driver such that each unit frame period is formed by a plurality of sub-frame periods, and a duty ratio in each sub-frame period is controlled. The controller controls the driver such that in each unit frame, the duty ratio of a last sub-frame period is smaller than the duty ratio of a first sub-frame period.

10 Claims, 12 Drawing Sheets

(56) References Cited

U.S. PATENT DOCUMENTS

| | | | | |
|---|---|---|---|---|
| 2024/0038157 | A1 | 2/2024 | Lee | |
| 2024/0304132 | A1* | 9/2024 | Li | G09G 3/32 |
| 2025/0138608 | A1 | 5/2025 | Ito | |

FOREIGN PATENT DOCUMENTS

| | | | |
|---|---|---|---|
| JP | 2019-015794 | A | 1/2019 |
| JP | 2021-076828 | A | 5/2021 |

* cited by examiner

DISPLAY DEVICE WHOSE DUTY RATIO IN SUB-FRAME PERIOD IS CONTROLLED

BACKGROUND OF THE INVENTION

Field of the Invention

The present invention relates to a display device, a display apparatus, a photoelectric conversion apparatus, an electronic apparatus, and a wearable device.

Description of the Related Art

Display devices are recently used for various application purposes and have been developed extensively in the field of compact displays mounted in portable devices. The portable devices can easily be handled and are therefore used in various environments regardless of outdoor/indoor places. A display device is required to provide optimum display images in use environments of various ambient luminances, including a dark environment such as a nighttime outdoor place without moonlight or a room without lighting and a bright environment such as an outdoor place with sunlight in fine weather.

The display device performs a refresh operation of rewriting an image several ten to several hundred times per sec. As an index on the display device side for outputting an image, the frequency of the refresh operation is called a refresh rate. As for display on the display device, an image of a high refresh rate is favorable because it looks more natural. However, an increase of the refresh rate is not preferable in most cases because it increases the circuit scale of the display device and also increases power consumption during driving. Particularly in a case of a small display mounted on a portable device, an increase of power consumption makes the battery of the device bulky, and this undesirably leads to an increase of the product weight or product size. On the other hand, if the refresh rate is low, image flickering called a flicker is visually recognized. Hence, the display device is normally used with a frequency of about 60 Hz at which flickers are hard to visually recognize.

A display device such as an organic EL (OLED) or a micro LED uses a self-emission type light-emitting element in each pixel, and applies a desired current to each light-emitting element, thereby causing it to emit light. Since the period to cause light emission corresponds to the current application period, the light-emitting period in one frame can be adjusted. The ratio of the light-emitting period to the period of one frame is called a duty ratio. If the duty ratio is 100% (if light emission is always performed), no flicker occurs in 60-Hz driving. However, in an image of quick motion, since the difference between two continuous frame images is large, the images are averaged by the after image effect of human vision, and a blurred image is recognized. The after image effect of vision is called a blur or a motion blur. Japanese Patent Laid-Open No. 2006-030516 describes a technique of suppressing flickers by dividing one frame into a plurality of sub-frames and causing light-emitting elements to emit light only during a light-emitting period according to the duty ratio for each sub-frame.

The present inventor found, as a result of examinations, that in the technique described in Japanese Patent Laid-Open No. 2006-030516, since the duty ratio does not change between sub-frames in a frame, the blur suppression effect is insufficient in an image of quick motion even if duty driving is performed.

SUMMARY OF THE INVENTION

The present invention provides a technique advantageous for simultaneously implementing suppression of a flicker and suppression of a blur in a method of diving one frame period into a plurality of sub-frame periods.

One of aspects of the present invention provides a display device comprising a pixel array, a driver configured to drive the pixel array, and a controller configured to control the driver, wherein the controller controls the driver such that each unit frame period is formed by a plurality of sub-frame periods, and a duty ratio in each sub-frame period is controlled, and the controller controls the driver such that in each unit frame, the duty ratio of a last sub-frame period is smaller than the duty ratio of a first sub-frame period.

Further features of the present invention will become apparent from the following description of exemplary embodiments with reference to the attached drawings.

DESCRIPTION OF THE EMBODIMENTS

Figure 1:
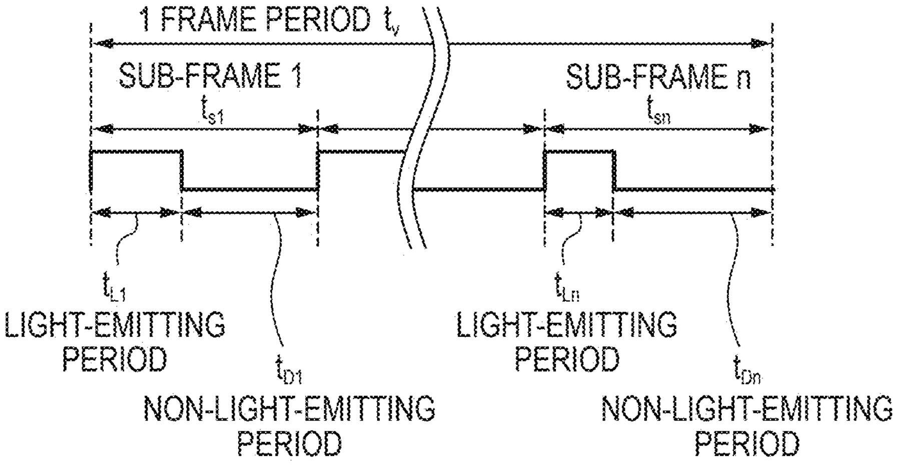
FIG. 1 is a timing chart showing the operation of a display device according to the first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

A display device according to the first embodiment can include a pixel array, a driver configured to drive the pixel array, and a controller configured to control the driver. The controller controls the driver such that each unit frame period is formed by a plurality of sub-frame periods, and a duty ratio in each sub-frame period is controlled. The plurality of sub-frame periods can have time lengths equal to each other. The controller can control the driver such that in each unit frame, the duty ratio of a first sub-frame period and the duty ratio of a last sub-frame period are different. The controller can control the driver such that each sub-frame period is formed by a light-emitting period and a non-light-emitting period, and the light-emitting period starts at the start of each sub-frame period, and the non-light-emitting period starts at the end of the light-emitting period. The controller can control the driver such that in each unit frame, the duty ratio of the last sub-frame period is smaller than at least the duty ratio of the first sub-frame period. The controller can control the driver such that in each unit frame, the duty ratio of the last sub-frame period is smaller than the duty ratio of a sub-frame period other than the last sub-frame period in the plurality of sub-frame periods. The controller can control the driver such that the non-light-emitting period of the last sub-frame period in each frame period is 3 msec or more.

FIG. 1 exemplarily shows the operation of a display device according to the first embodiment in one frame period $t_V$. The one frame period $t_V$ is also called one vertical scanning period or a unit frame period. To each pixel of the pixel array, at a rate of once in one frame period, a luminance signal can be supplied and a signal according to the luminance signal can be written. In the plurality of sub-frame periods forming each frame period, the duty ratio of the last sub-frame period to at least the duty ratio of the first sub-frame period is small and, therefore, $t_{Ln}<t_{L1}$(and $t_{D1}<t_{Dn}$) are satisfied. Here, tri is the light-emitting period in the first sub-frame period, and $t_{D1}$ is the non-light-emitting period in the first sub-frame period. Also, $t_{Ln}$ is the light-emitting period in the last sub-frame period, and $t_{Dn}$ is the non-light-emitting period in the last sub-frame period.

The display device can be a self-emission type display device such as an organic light emitting diode (OLED) (also called an organic EL)) or a micro LED. The self-emission type display device is excellent because of its high refresh rate, as compared to a display device that is not of a self-emission type such as a liquid crystal display (LCD).

The display device can form a display apparatus together with a power supply, an image controller, an operation controller, and the like. The display apparatus may be formed as, for example, a smartphone, a monitor display, an XR device, an electro view finder (EVF), a monocle, binoculars, or night vision goggles, regardless of portable/nonportable device. Also, the display apparatus may use a display device of any size. An optical system such as a lens may be arranged between the display device and eyes.

The display device according to the first embodiment will exemplarily be described below using several examples.

Example 1-1

Figure 2:
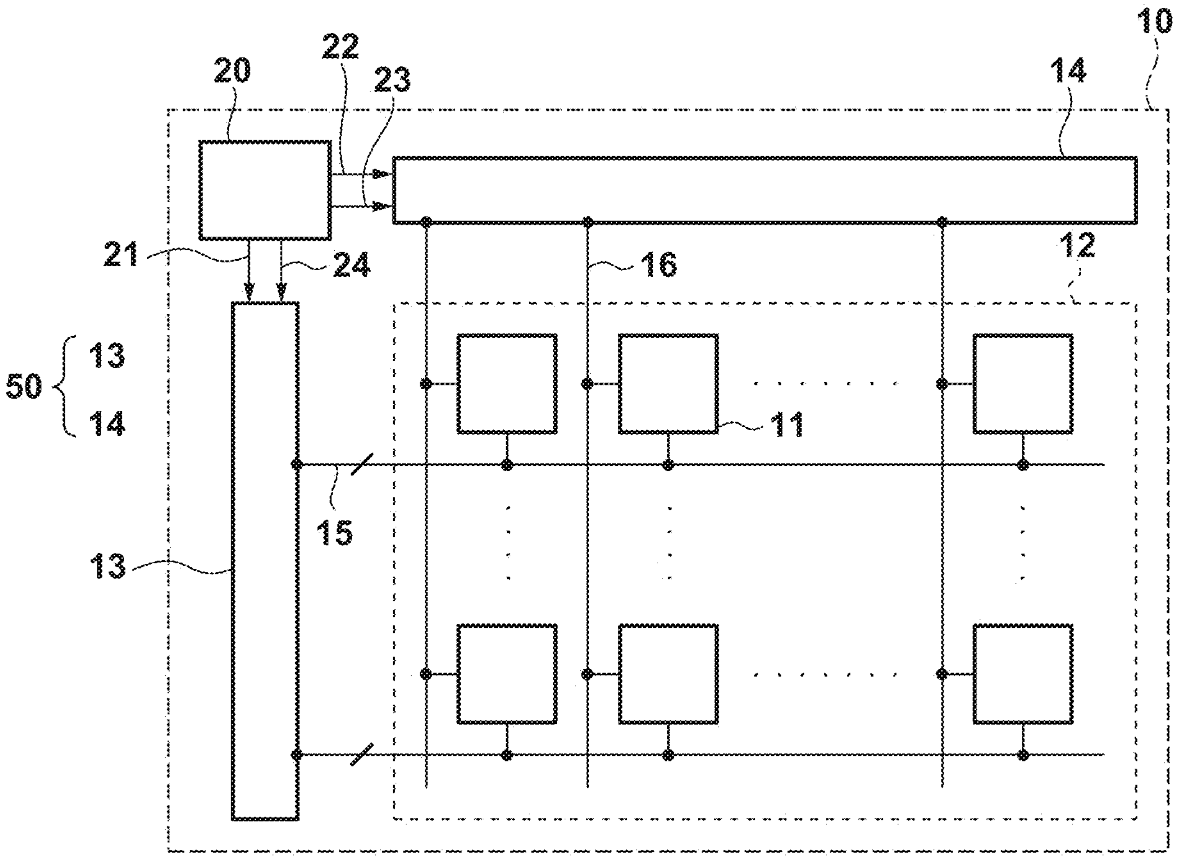
FIG. 2 is a view schematically showing the configuration of a display device according to an example of the first embodiment.

FIG. 2 schematically shows the configuration of a display device according to Example 1-1. A display device 10 can include a pixel array 12, a vertical scanning circuit 13, a signal output circuit 14, and a controller 20. The vertical scanning circuit 13 and the signal output circuit 14 can form a driver 50 configured to drive the pixel array 12. The pixel array 12 includes a plurality of pixels 11 arranged to form a plurality of rows and columns. The controller 20 can generate a plurality of control signals for controlling the vertical scanning circuit 13 and the signal output circuit 14. The controller 20 can supply, for example, a scanning control signal 24 for vertical scanning and a light emission control signal 21 for controlling the duty ratio (a light-emitting period in another viewpoint) to the vertical scanning circuit 13. The controller 20 can also supply a signal output control signal 22 and display image data 23 to the signal output circuit 14.

The vertical scanning circuit 13 can be configured to drive a plurality of scanning line groups 15 extending in the row direction. Each scanning line group 15 can include a write control line and a drive signal line. Each pixel 11 can include a light-emitting element, a drive transistor that drives the light-emitting element in accordance with a luminance signal, a switch transistor that controls light emission/non-light emission of the light-emitting element, and a write transistor that writes a signal according to the luminance signal to the gate of the drive transistor. The luminance signal can be supplied from the signal output circuit 14 to the write transistor via a signal line 16. The write control line can be connected to the gate of the write transistor, and the drive signal line can be connected to the gate of the switch transistor. A period in which a drive signal supplied to the drive signal line is active is the light-emitting period, and a period in which the drive signal supplied to the drive signal line is inactive is the non-light-emitting period. The vertical scanning circuit 13 controls the voltage of the write control line of each row, that is, a write control signal in accordance with the vertical scanning control signal 24.

The signal output circuit 14 D/A-converts the display image data 23 sequentially sent from the controller 20, thus generates, as a luminance signal, a voltage signal having a voltage according to the value of the display image data 23, and outputs it to each signal line 16. The pixel 11 is arranged at the intersection between the scanning line group 15 and the signal line 16, and the scanning line group 15 and the signal line 16 are connected to the corresponding pixel 11.

The light-emitting element of the pixel 11 is, for example, an OLED, and a transistor such as a drive transistor, a switch transistor, or a write transistor can be, for example, a field effect transistor (FET). The OLED can be formed by, for example, sequentially stacking a hole injection layer, a hole transport layer, a light-emitting layer, an electron transport layer, an electron injection layer, and the like between an anode and a cathode, at least one of which is transparent. The FET can be, for example, a silicon thin film transistor (TFT).

Figure 3:
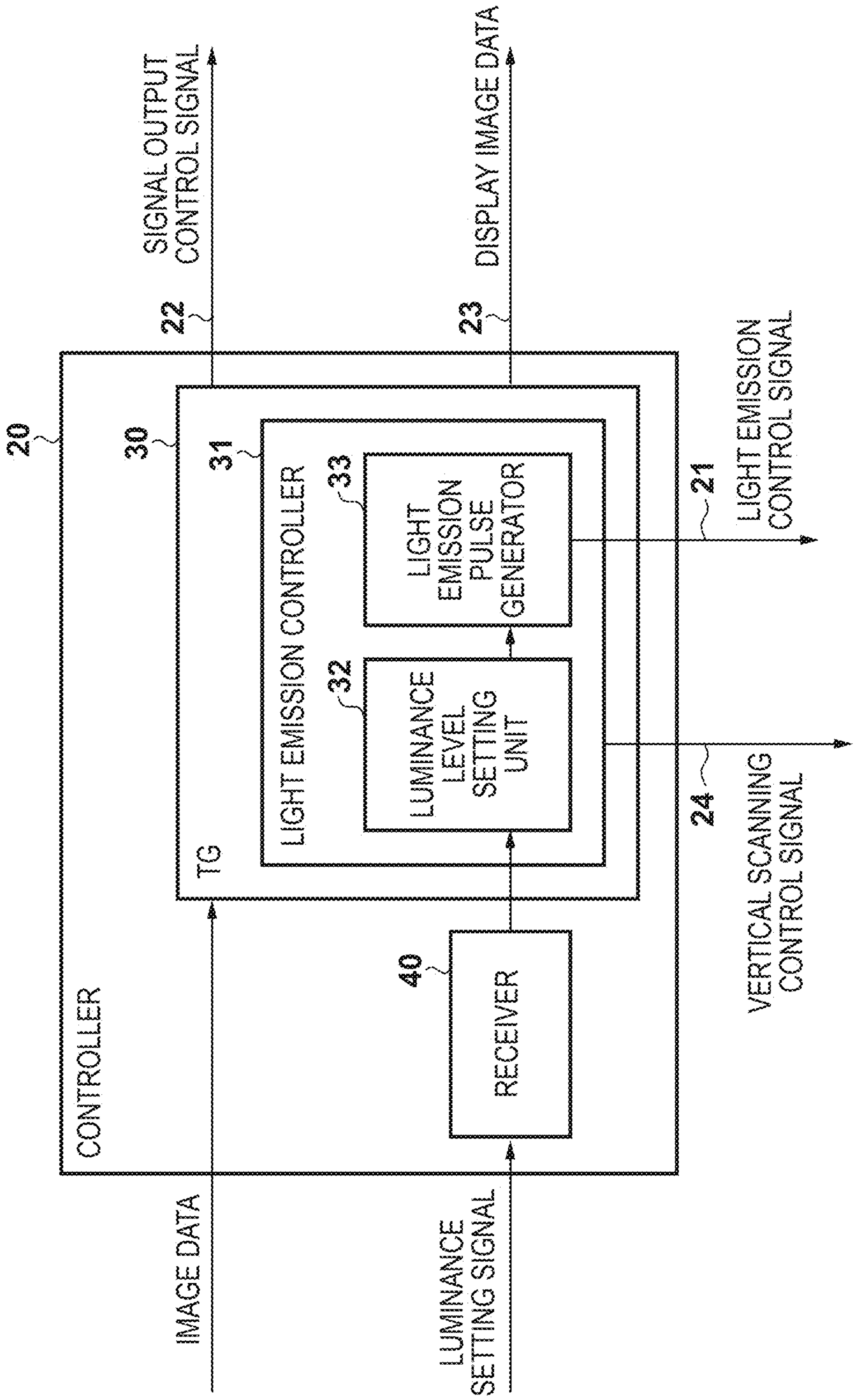
FIG. 3 is a view showing the configuration of the controller of the display device according to an example of the first embodiment.

FIG. 3 shows an example of the configuration of the controller 20. FIG. 3 is a view with attention paid on generation of the light emission control signal 21, and generation of the signal output control signal 22, the display image data 23, and the scanning control signal 24 can comply with known techniques. The controller 20 can include a timing generator (TG) 30 and a receiver 40. The receiver 40 can receive a luminance setting signal and supply it to the TG 30. The TG 30 can receive image data supplied from the outside of the display device 10 and a synchronization signal (not shown), and generate the signal output control signal 22, the display image data 23, and the scanning control signal 24. The TG 30 can include a light emission controller 31 that generates the light emission control signal 21 (light emission pulse) in accordance with the luminance setting signal supplied from the receiver 40. The light emission controller 31 can include, for example, a luminance level setting unit 32 and a light emission pulse generator 33.

The display apparatus including the display device 10 can include an interface (for example, physical buttons or a GUI) configured to set the luminance of the display device 10. If the luminance is changed by a user operating the interface, the luminance setting signal can be supplied to the controller 20 (receiver 40) of the display device 10. When the receiver 40 receives the luminance setting signal and supplies it to the TG 30, the luminance level setting unit 32 of the TG 30 sets the luminance and the duty ratio in each frame period. The light emission pulse generator 33 can generate the light emission control signal 21 (pulse signal) that defines a light-emitting period and a non-light-emitting period in accordance with the duty ratio set by the luminance level setting unit 32. Note that the TG 30 can generate the display image data 23 in accordance with the luminance and the image data set by the luminance level setting unit 32.

The controller 20 (the TG 30 or the light emission pulse generator 33 in another viewpoint) can generate the light emission control signal 21 such that one frame (unit frame) period of image data is temporally evenly divided into a plurality of (in other words, n) sub-frame periods. The light-emitting period of sub-frame period 1 that is the first sub-frame period is expressed as $t_{L1}$, and the non-light-emitting period as $t_{D1}$. Similarly, the light-emitting period of a kth (k is an integer, 1≤k≤n) sub-frame period k is expressed as $t_{Lk}$, and the non-light-emitting period as $t_{Dk}$. Since one frame period is evenly divided into a plurality of sub-frame periods, $t_{L1}+t_{D1}=t_{L2}+t_{D2}= \ldots =t_{Ln}+t_{Dn}$. Also, in the first embodiment, at least $t_{Ln}<t_{L1}(t_{D1}<t_{Dn})$. To simplify control by the controller 20, $t_{Ln}<t_{L1}= \ldots =t_{Ln-1}$ is preferable. However, depending on the relationship between the timing setting of image data displayed by the display device 10 and the number n of divisions of one frame period (the total number of sub-frame periods), it may be impossible to completely evenly divide the frame period (set $t_{L1}+t_{D1}=t_{L2}+t_{D2}= \ldots =t_{Ln}+t_{Dn}$). It is preferable to completely evenly divide the frame period, but an error is allowed to occur in a range not deviating from the relational expression of $t_{Ln}<t_{L1}$.

Figure 4:
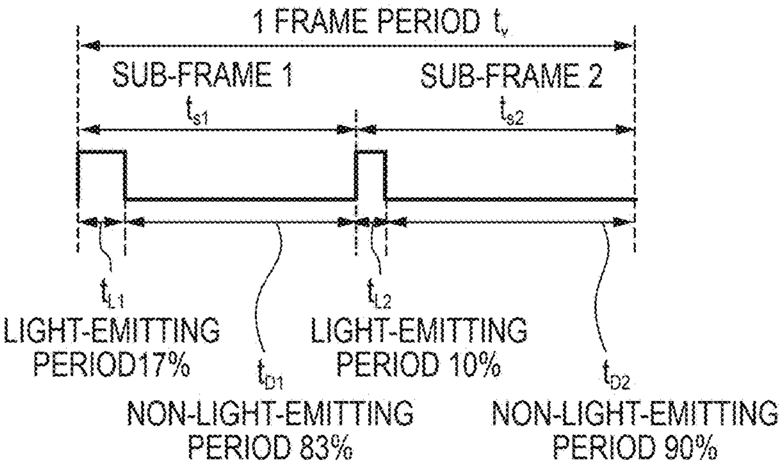
FIG. 4 is a timing chart showing the operation of a display device according to Example 1-1.

In Example 1-1, the refresh rate of the display device 10 is set to 60 Hz. Also, in Example 1-1, as shown in FIG. 4, one frame period of image data of 60 fps (frames per second) is divided into two sub-frame periods. The controller 20 (light emission controller 31) controls the driver 50 (vertical scanning circuit 13) such that each sub-frame period is formed by a light-emitting period and a non-light-emitting period, the light-emitting period starts at the start of each sub-frame period, and the non-light-emitting period starts at the end of the light-emitting period.

Letting $t_v$ be one frame period, in Example 1-1, since $t_{L1}=(1/2)t_v*0.17=0.085t_v$, and $t_{L2}=(1/2)t_v*0.10=0.050t_v$, $t_{Ln}<t_{L1}$.

Thus, the light emission controller 31 controls the vertical scanning circuit 13 such that in each frame period, the duty ratio of the last sub-frame period is smaller than at least the duty ratio of the first sub-frame period. At refresh rate=60 Hz, since each frame period is divided into two sub-frame periods, an apparent refresh rate is 120 Hz. Since flickers are rarely recognized in driving at 120 Hz, it can be said that flickers are suppressed in Example 1-1. Also, as compared to a case where the device is driven at duty ratio=17% in all sub-frame periods, the non-light-emitting period is as long as 90% because the duty ratio of the sub-frame period immediately before switching of the display image data (sub-frame period 2 in Example 1-1) is 10%. Since the non-light-emitting period immediately before switching of the display image data is long, a blur that occurs when images are averaged by the after image effect of human vision can be suppressed more.

The present inventor found, as a result of examinations, that when the non-light-emitting period is provided after the light-emitting period in the sub-frame period, a higher suppression effect can be obtained to suppress blurs if the period to change the display image data between two continuous frame periods is 3 msec or more. The period to change the display image data between two continuous frame periods is the period from the end of the light-emitting period of the last sub-frame period to the start of light emission in the first sub-frame period of the next frame period. More specifically, if a period in which a vertical synchronization signal between two continuous frame periods is invalid is indicated by $t_{vsoff}$, $t_{Dn}+t_{vsoff}≥3$ msec is preferable. Letting $R_{dn}$ be the duty ratio of the last sub-frame period, $t_{Dn}$ is given by $t_{Dn}=t_v/(n*R_{dn})$. However, in the display device, since $t_{vsoff}$ is normally in the 0.01 msec order ($t_{vsoff}<<3$ msec), control is preferably performed to satisfy $t_{Dn}≥3$ msec. In Example 1-1, $t_{D2}=7.5$ msec.

Figure 5:
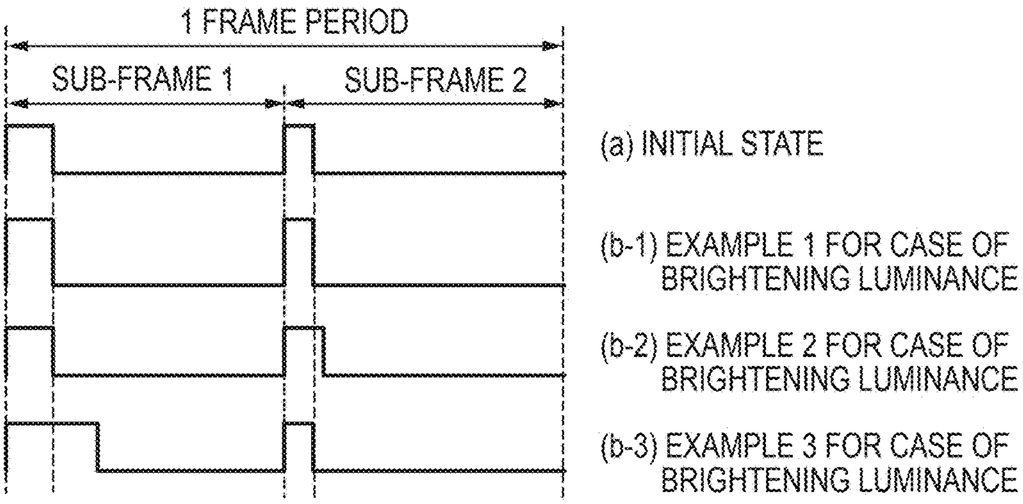
FIG. 5 is a timing chart for explaining Example 1-1.

In Example 1-1, if the user is going to change the luminance setting, the receiver 40 receives luminance setting information and sends a signal to the luminance level setting unit 32. If the user is going to make the luminance high, setting by the luminance level setting unit 32 is done in accordance with a driving example shown in FIG. 5. The same driving as the driving shown in FIG. 4 is defined as (a) initial state. In contrast, in (b-1), the luminance is made high by increasing the intensity of the light emission pulse. In (b-2), the luminance is made high by lengthening the light-emitting period $t_{Ln}$ of the last sub-frame period (in Example 1-1, $t_{L2}$ in sub-frame period 2). In (b-3), the luminance is made high by lengthening the light-emitting period of the sub-frame period other than the last sub-frame period (in Example 1-1, the light-emitting period tri in sub-frame period 1).

In the driving method of controlling the duty ratio (duty driving), the method of making the luminance high by increasing the intensity of the light emission pulse, like (b-1), is sometimes not preferable. Examples are a case where the light emission efficiency of a display element does not rise even if the voltage is made high and a case where there is a restriction by a maximum voltage suppliable to a light-emitting element. In (b-2), since it is necessary to satisfy the condition that $t_{L2}<t_{L1}$ to obtain the effect of the first embodiment, there is a restriction by this condition.

Hence, setting is preferably done as in the example of (b-3). However, the luminance may be set by combining (b-1), (b-2), and (b-3).

Figure 6:
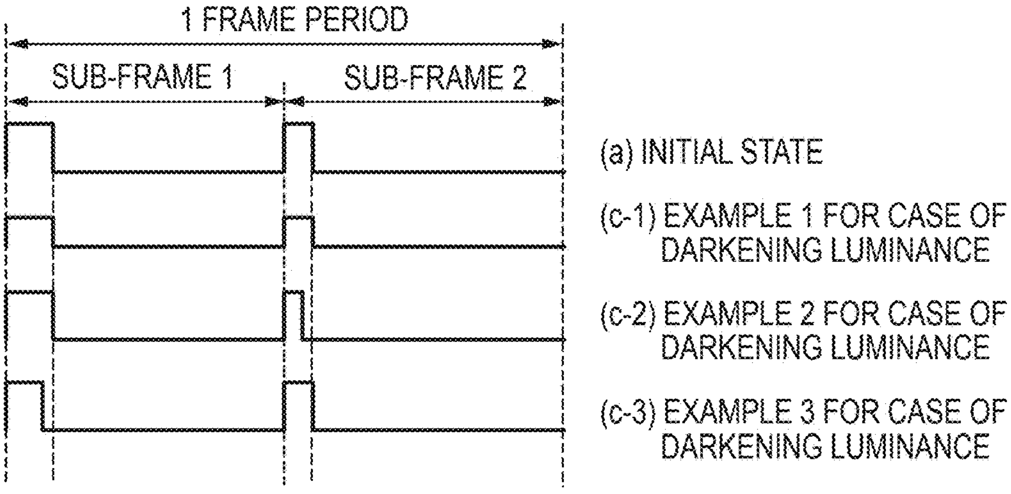
FIG. 6 is a timing chart for explaining Example 1-1.

Similarly, if the user is going to make the luminance low, setting by the luminance level setting unit 32 is done in accordance with a driving example shown in FIG. 6. In (c-1), the luminance is made low by decreasing the intensity of the light emission pulse. In (c-2), the luminance is made low by shortening the light-emitting period $t_{Ln}$ of the last sub-frame period (in Example 1-1, $t_{L2}$ in sub-frame period 2). In (c-3), the luminance is made low by shortening the light-emitting period of the sub-frame period other than the last sub-frame period (in Example 1-1, the light-emitting period tri in sub-frame period 1). In (c-2), since $t_{L2}$ cannot be less than 0, the luminance setting has a lower limit. In (c-3), since it is necessary to satisfy the condition that $t_{L2}<t_{L1}$ to obtain the effect of the first embodiment, there is a restriction by this condition. Hence, setting is preferably done as in the example of (c-1). However, the luminance may be set by combining (c-1), (c-2), and (c-3).

Example 1-2

Figure 7:
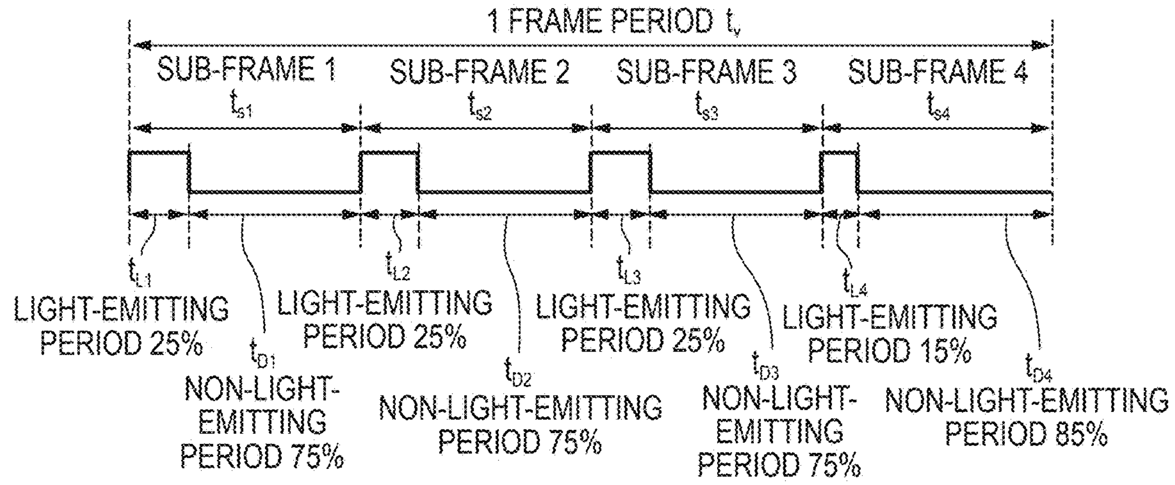
FIG. 7 is a timing chart showing the operation of a display device according to Example 1-2.

In Example 1-2, the refresh rate of a display device 10 is set to 60 Hz. Also, in Example 1-2, as shown in FIG. 7, one frame period of image data of 60 fps is divided into four sub-frame periods. A controller 20 (light emission controller 31) controls a driver 50 (vertical scanning circuit 13) such that each sub-frame period is formed by a light-emitting period and a non-light-emitting period, the light-emitting period starts at the start of each sub-frame period, and the non-light-emitting period starts at the end of the light-emitting period.

At refresh rate=60 Hz, since each frame period is divided into four sub-frame periods, an apparent refresh rate is 240 Hz. Since flickers are rarely recognized in driving at 240 Hz, it can be said that flickers are suppressed in Example 1-2. Also, as compared to a case where the device is driven at duty ratio=25% in all sub-frame periods, the non-light-emitting period is as long as 85% because the duty ratio of the last sub-frame period to switch the display image data (sub-frame period 4 in Example 1-2) is 15%. Since the non-light-emitting period immediately before switching of the display image data is long, a blur that occurs when images are averaged by the after image effect of human vision can be suppressed more. In addition, since $t_{D4}$=3.5 msec, $t_{Dn}\geq 3$ msec is satisfied.

In Example 1-2 as well, if the user is going to change the luminance setting, the setting can be done by the same method as described in Example 1-1.

Example 1-3

Figure 8:
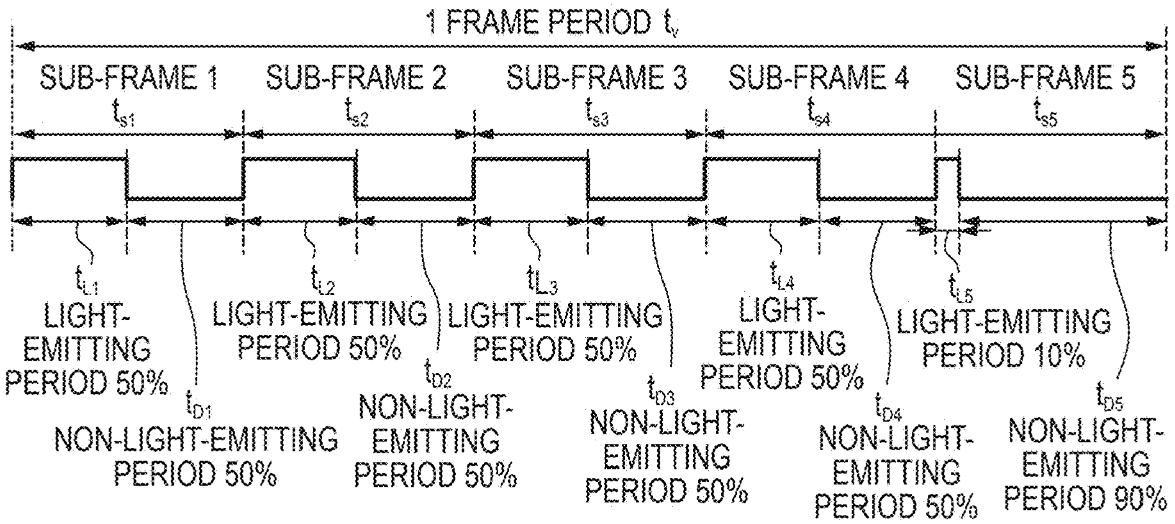
FIG. 8 is a timing chart showing the operation of a display device according to Example 1-3.

In Example 1-3, the refresh rate of a display device 10 is set to 60 Hz. In Example 1-3, as shown in FIG. 8, one frame period of image data of 60 fps is divided into five sub-frame periods. A controller 20 (light emission controller 31) controls a driver 50 (vertical scanning circuit 13) such that each sub-frame period is formed by a light-emitting period and a non-light-emitting period, the light-emitting period starts at the start of each sub-frame period, and the non-light-emitting period starts at the end of the light-emitting period.

At refresh rate=60 Hz, since each frame period is divided into five sub-frame periods, an apparent refresh rate is 300 Hz. Since flickers are rarely recognized in driving at 300 Hz, it can be said that flickers are suppressed in Example 1-3. Also, as compared to a case where the device is driven at duty ratio=50% in all sub-frame periods, the non-light-emitting period is as long as 90% because the duty ratio of the last sub-frame period to switch the display image data (sub-frame period 5 in Example 1-3) is 10%. Since the non-light-emitting period immediately before switching of the display image data is long, a blur that occurs when images are averaged by the after image effect of human vision can be suppressed more. In addition, since $t_{D5}$=3.0 msec, $t_{Dn}\geq 3$ msec is satisfied.

In Example 1-3 as well, if the user is going to change the luminance setting, the setting can be done by the same method as described in Example 1-1.

Example 1-4

Figure 9:
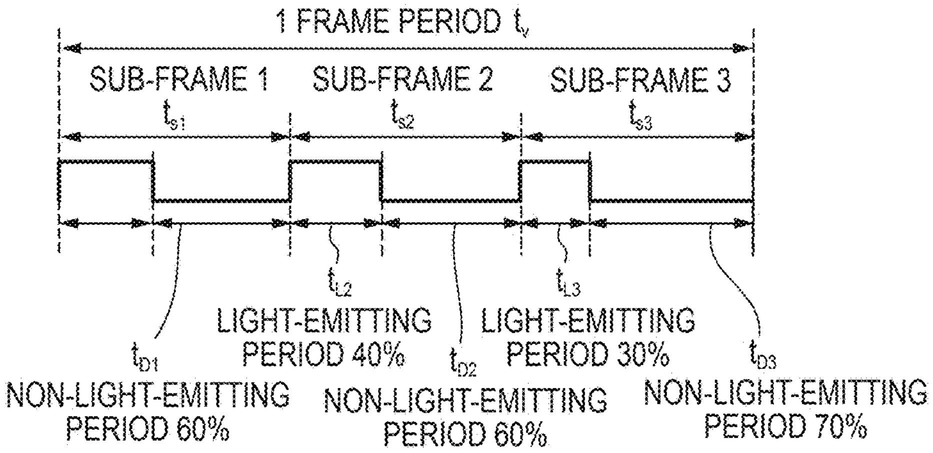
FIG. 9 is a timing chart showing the operation of a display device according to Example 1-4.

In Example 1-4, the refresh rate of a display device 10 is set to 72 Hz. In Example 1-4, as shown in FIG. 9, one frame period of image data of 72 fps is divided into three sub-frame periods. A controller 20 (light emission controller 31) controls a driver 50 (vertical scanning circuit 13) such that each sub-frame period is formed by a light-emitting period and a non-light-emitting period, the light-emitting period starts at the start of each sub-frame period, and the non-light-emitting period starts at the end of the light-emitting period.

At refresh rate=72 Hz, since each frame period is divided into three sub-frame periods, an apparent refresh rate is 216 Hz. Since flickers are rarely recognized in driving at 216 Hz, it can be said that flickers are suppressed in Example 1-4. Also, as compared to a case where the device is driven at duty ratio=40% in all sub-frame periods, the non-light-emitting period is as long as 70% because the duty ratio of the last sub-frame period to switch the display image data (sub-frame period 3 in Example 1-4) is 30%. Since the non-light-emitting period immediately before switching of the display image data is long, a blur that occurs when images are averaged by the after image effect of human vision can be suppressed more. In addition, since $t_{D3}$=3.2 msec, $t_{Dn}\geq 3$ msec is satisfied.

In Example 1-4, if the user is going to change the luminance setting, the setting can be done by the same method as described in Example 1-1.

Example 1-5

Figure 10:
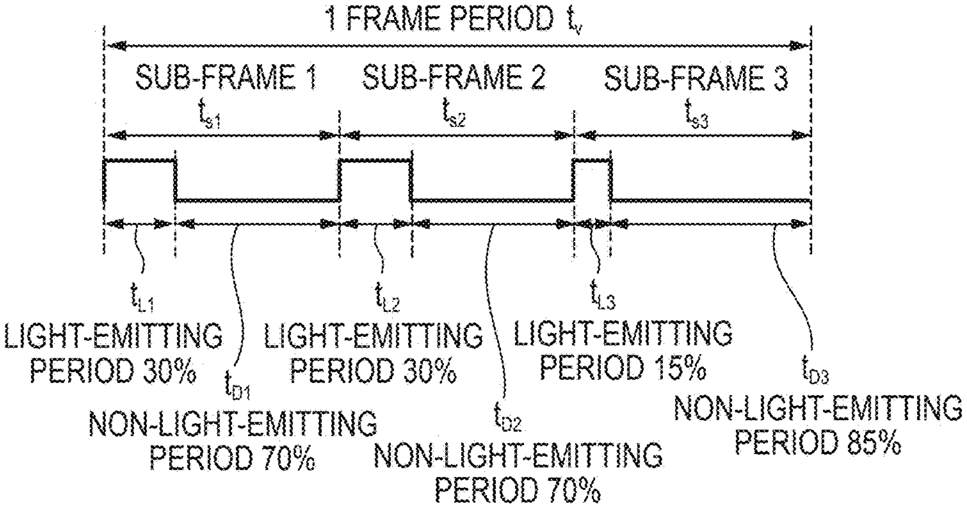
FIG. 10 is a timing chart showing the operation of a display device according to Example 1-5.

In Example 1-5, the refresh rate of a display device 10 is set to 90 Hz. In Example 1-5, as shown in FIG. 10, one frame period of image data of 90 fps is divided into three sub-frame periods. A controller 20 (light emission controller 31) controls a driver 50 (vertical scanning circuit 13) such that each sub-frame period is formed by a light-emitting period and a non-light-emitting period, the light-emitting period starts at the start of each sub-frame period, and the non-light-emitting period starts at the end of the light-emitting period.

At refresh rate=90 Hz, since each frame period is divided into three sub-frame periods, an apparent refresh rate is 270 Hz. Since flickers are rarely recognized in driving at 270 Hz, it can be said that flickers are suppressed in Example 1-5. Also, as compared to a case where the device is driven at duty ratio=30% in all sub-frame periods, the non-light-emitting period is as long as 85% because the duty ratio of the last sub-frame period to switch the display image data (sub-frame period 3 in Example 1-5) is 15%. Since the non-light-emitting period immediately before switching of the display image data is long, a blur that occurs when images are averaged by the after image effect of human vision can be suppressed more. In addition, since $t_{D3}$=3.1 msec, $t_{Dn}$≥3 msec is satisfied.

In Example 1-5 as well, if the user is going to change the luminance setting, the setting can be done by the same method as described in Example 1-1.

Example 1-6

Figure 11:
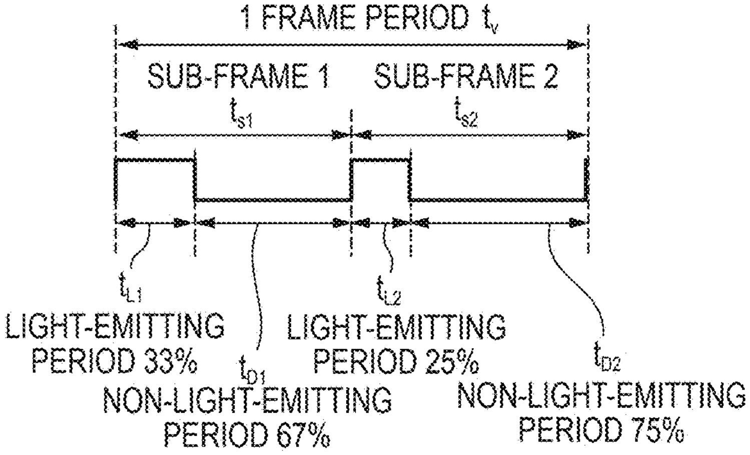
FIG. 11 is a timing chart showing the operation of a display device according to Example 1-6.

In Example 1-6, the refresh rate of a display device 10 is set to 120 Hz. In Example 1-6, as shown in FIG. 11, one frame period of image data of 120 fps is divided into two sub-frame periods. A controller 20 (light emission controller 31) controls a driver 50 (vertical scanning circuit 13) such that each sub-frame period is formed by a light-emitting period and a non-light-emitting period, the light-emitting period starts at the start of each sub-frame period, and the non-light-emitting period starts at the end of the light-emitting period.

At refresh rate=120 Hz, since each frame period is divided into two sub-frame periods, an apparent refresh rate is 240 Hz. Since flickers are rarely recognized in driving at 240 Hz, it can be said that flickers are suppressed in Example 1-6. Also, as compared to a case where the device is driven at duty ratio=33% in all sub-frame periods, the non-light-emitting period is as long as 75% because the duty ratio of the last sub-frame period to switch the display image data (sub-frame period 2 in Example 1-6) is 25%. Since the non-light-emitting period immediately before switching of the display image data is long, a blur that occurs when images are averaged by the after image effect of human vision can be suppressed more. In addition, since $t_{D2}$=3.1 msec, $t_{Dn}$≥3 msec is satisfied.

In Example 1-6 as well, if the user is going to change the luminance setting, the setting can be done by the same method as described in Example 1-1.

Second Embodiment

The second embodiment will be described below. Matters that are not mentioned as the second embodiment can comply with the first embodiment. In the second embodiment, a controller 20 can control a driver 50 such that each sub-frame period is formed by a light-emitting period and a non-light-emitting period, the non-light-emitting period starts at the start of each sub-frame period, and the light-emitting period starts at the end of the non-light-emitting period. The controller 20 can control the driver 50 such that in each unit frame, the duty ratio of the first sub-frame period is smaller than at least the duty ratio of the last sub-frame period. The controller 20 can control the driver 50 such that in each unit frame, the duty ratio of the first sub-frame period is smaller than the duty ratio of each sub-frame period other than the first sub-frame period in a plurality of sub-frame periods. The controller 20 can control the driver 50 such that the non-light-emitting period of the first sub-frame period in each frame period is 3 msec or more.

Figure 12:
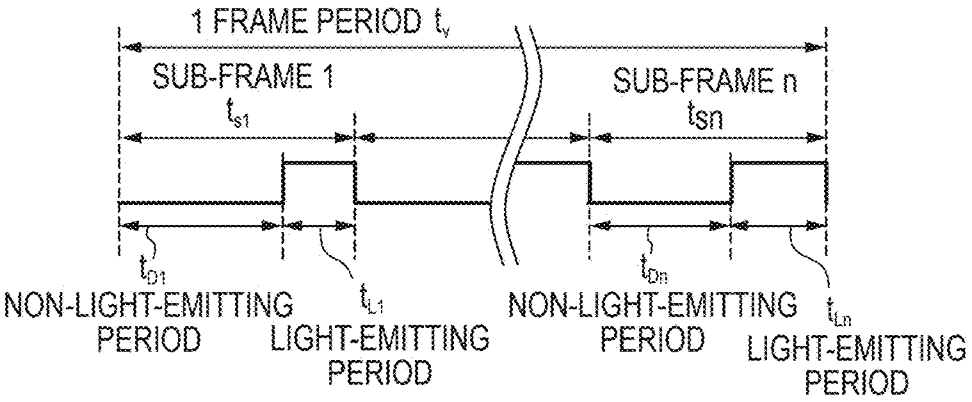
FIG. 12 is a timing chart showing the operation of a display device according to the second embodiment.

FIG. 12 exemplarily shows the operation of a display device 10 according to the second embodiment in one frame period $t_V$. In the plurality of sub-frame periods forming each frame period, the duty ratio of the first sub-frame period to at least the duty ratio of the last sub-frame period is small and, therefore, $t_{L1}<t_{Ln}$ (and $t_{Dn}<t_{D1}$) are satisfied.

Example 2-1

A controller 20 (a TG 30 or a light emission pulse generator 33 in another viewpoint) can generate a light emission control signal 21 such that one frame (unit frame) period of image data is temporally evenly divided into a plurality of (in other words, n) sub-frame periods. The non-light-emitting period of sub-frame period 1 that is the first sub-frame period is expressed as $t_{D1}$, and the light-emitting period as $t_{L1}$. Similarly, the non-light-emitting period of a kth (k is an integer, 1≤k≤n) sub-frame period k is expressed as $t_{Dk}$, and the light-emitting period as $t_{Lk}$. Since one frame period is evenly divided into a plurality of sub-frame periods, $t_{D1}+t_{L1}=t_{D2}+t_{L2}= \ldots =t_{Dn}+t_{Ln}$. Also, in the second embodiment, at least $t_{L1}<t_{Ln}$ (the same is applied as $t_{Dn}<t_{D1}$). To simplify control by the controller 20, $t_{L1}<t_{L2}= \ldots =t_{Ln}$ is preferable. However, depending on the relationship between the timing setting of image data displayed by a display device 10 and the number n of divisions of one frame (the total number of sub-frame periods), it may be impossible to completely evenly divide the frame period (set $t_{D1}+t_{L1}=t_{D2}+t_{D2}= \ldots =t_{Dn}+t_{Ln}$). It is preferable to completely evenly divide the frame period, but an error is allowed to occur in a range not deviating from the relational expression of $t_{L1}<t_{Ln}$.

Figure 13:
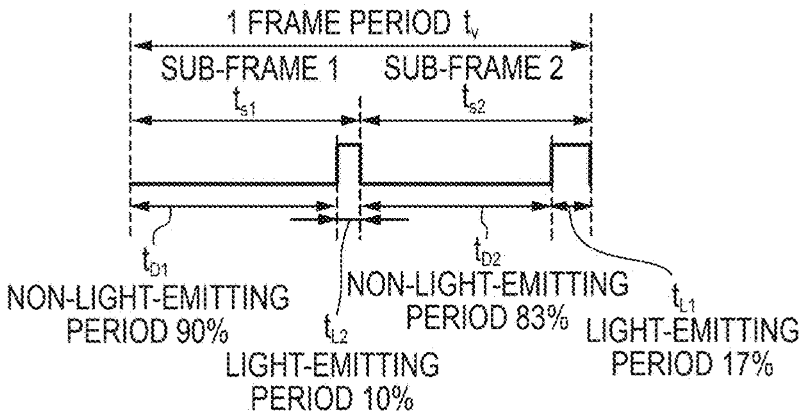
FIG. 13 is a timing chart showing the operation of a display device according to Example 2-1.

In Example 2-1, the refresh rate of the display device 10 is set to 60 Hz. Also, in Example 2-1, as shown in FIG. 13, one frame period of image data of 60 fps is divided into two sub-frame periods. The controller 20 (light emission controller 31) controls a driver 50 (vertical scanning circuit 13) such that each sub-frame period is formed by a light-emitting period and a non-light-emitting period, the non-light-emitting period starts at the start of each sub-frame period, and the light-emitting period starts at the end of the non-light-emitting period.

Letting $t_v$ be one frame period, in Example 2-1, since $t_{L1}=(1/2)t_v*0.10=0.050t_v$, and $t_{L2}=(1/2)t_v*0.17=0.085t_v$, $t_{L1}<t_{Ln}$.

Thus, the light emission controller 31 controls the vertical scanning circuit 13 such that in each frame period, the duty ratio of the first sub-frame period is smaller than at least the duty ratio of the last sub-frame period. At refresh rate=60 Hz, since each frame period is divided into two sub-frame periods, an apparent refresh rate is 120 Hz. Since flickers are rarely recognized in driving at 120 Hz, it can be said that flickers are suppressed in Example 2-1. Also, as compared to a case where the device is driven at duty ratio=17% in all sub-frame periods, the non-light-emitting period is as long as 90% because the duty ratio of the sub-frame period immediately before switching of the display image data (sub-frame period 1 in Example 2-1) is 10%. Since the non-light-emitting period immediately before switching of the display image data is long, a blur that occurs when images are averaged by the after image effect of human vision can be suppressed more.

The present inventor found, as a result of examinations, that when the light-emitting period is provided after the non-light-emitting period in the sub-frame period, a higher suppression effect can be obtained to suppress blurs if the period to change the display image data between two continuous frame periods is 3 msec or more. The period to change the display image data between two continuous frame periods is the period from the end of the light-emitting period of the last sub-frame period to the start of light emission in the first sub-frame period of the next frame period. More specifically, if a period in which a vertical synchronization signal between two continuous frame periods is invalid is indicated by $t_{vsoff}$, $t_{D1}+t_{vsoff}\geq 3$ msec is preferable. Letting Rai be the duty ratio of the first sub-frame period, $t_{D1}$ is given by $t_{D1}=t_v/(n*R_{d1})$. However, in the display device, since $t_{vsoff}$ is normally in the 0.01 msec order ($t_{vsoff}$<<3 msec), control is preferably performed to satisfy $t_{D1}$≥3 msec. In Example 2-1, $t_{D1}$=7.5 msec.

In Example 2-1, if the user is going to change the luminance setting, the setting can be done by the same method as described in Example 1-1. To make the luminance high, it is possible to use a method of increasing the intensity of the light emission pulse, lengthening the light-emitting period $t_{L1}$ of the first sub-frame period (in Example 2-1, sub-frame period 1), or lengthening the light-emitting period of the sub-frame period other than the first sub-frame period (in Example 2-1, $t_{L2}$ of sub-frame period 2). The setting may be done by combining these methods. To make the luminance low, it is possible to use a method of decreasing the intensity of the light emission pulse, shortening the light-emitting period $t_{L1}$ of the first sub-frame period (in Example 2-1, sub-frame period 1), or shortening the light-emitting period of the sub-frame period other than the first sub-frame period (in Example 2-1, $t_{L2}$ of sub-frame period 2). The setting may be done by combining these methods. In any case, it is necessary to satisfy $t_{L1}<t_{Ln}$ to obtain the effect of the second embodiment.

Third Embodiment

The third embodiment will be described below. Matters that are not mentioned as the third embodiment can comply with the first or second embodiment. In the third embodiment, a controller 20 can control a driver 50 such that each sub-frame period is formed by a first non-light-emitting period, a light-emitting period, and a second non-light-emitting period. Also, the controller 20 can control the driver 50 such that the first non-light-emitting period starts at the start of each sub-frame period, the light-emitting period starts at the end of the first non-light-emitting period, and the second non-light-emitting period starts at the end of the light-emitting period. Also, the controller 20 can control the driver 50 such that in each unit frame, the duty ratio of the first sub-frame period and the duty ratio of the last sub-frame period are different.

Figure 14:
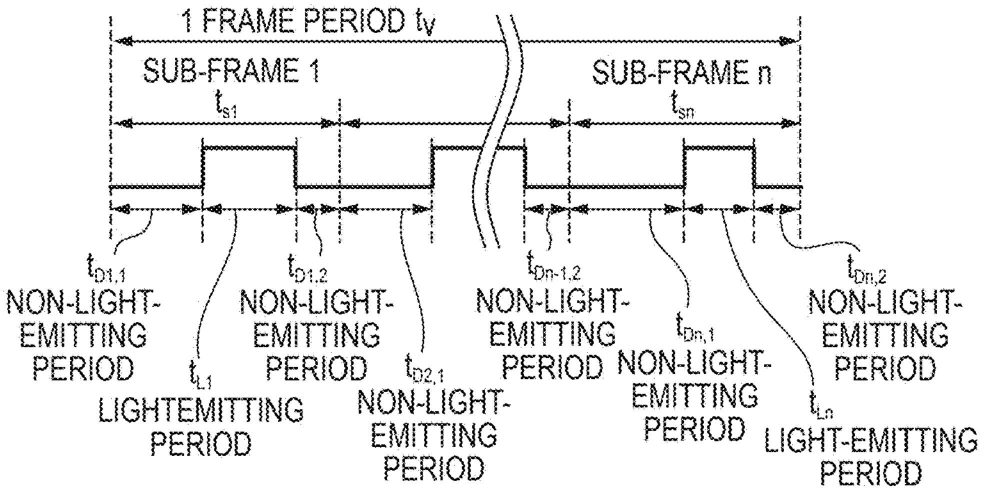
FIG. 14 is a timing chart showing the operation of a display device according to Example 2-2.

FIG. 14 exemplarily shows the operation of a display device 10 according to the third embodiment in one frame period $t_V$. When the lengths of the first non-light-emitting period, the light-emitting period, and the second non-light-emitting period in a kth (k is 1 to n) sub-frame are defined as $t_{Dk,1}$, $t_{Lk}$, and $t_{Dk,2}$, respectively, the controller 20 can control the driver 50 to satisfy $$t_{D1,2}+t_{D2,1}<t_{Dn,2}+t_{D1,1}$$

Example 3-1

A controller 20 (a TG 30 or a light emission pulse generator 33 in another viewpoint) can generate a light emission control signal 21 such that one frame (unit frame) period of image data is temporally evenly divided into a plurality of (in other words, n) sub-frame periods. The first non-light-emitting period, the light-emitting period, and the second non-light-emitting period of sub-frame period 1 that is the first sub-frame period are expressed as $t_{D1,1}$, $t_{L1}$, and $t_{D1,2}$, respectively. Similarly, the first non-light-emitting period, the light-emitting period, and the second non-light-emitting period of a kth (k is an integer, 1≤k≤n) sub-frame period k are expressed as $t_{Dk,1}$, $t_{Lk}$, and $t_{Dk,2}$, respectively. Since one frame is temporally evenly divided into a plurality of sub-frame periods, $t_{D1,1}+t_{L1}+t_{D1,2}=t_{D2,1}+t_{L2}+t_{D2,2}=\ldots=t_{Dn,1}+t_{Ln}+t_{Dn,2}$. Also, in the third embodiment, $t_{D1,2}+t_{D2,1}<t_{Dn,2}+t_{D1,1}$. To simplify control by the controller 20, $t_{D1,2}+t_{D2,1}=\ldots=t_{D(n-1),2}+t_{Dn,1}<t_{Dn,2}+t_{D1,1}$. However, depending on the relationship between the timing setting of image data displayed by the display device 10 and the number n of divisions of one frame (the total number of sub-frame periods), it may be impossible to completely evenly divide the frame period (set $t_{D1,1}+t_{L1}+t_{D1,2}=t_{D2,1}+t_{L2}+t_{D2,2}=\ldots=t_{Dn,1}+t_{Ln}+t_{Dn,2}$). It is preferable to completely evenly divide the frame period, but an error is allowed to occur in a range not deviating from the relational expression of $t_{D1,2}+t_{D2,1}<t_{Dn,2}+t_{D1,1}$.

Figure 15:
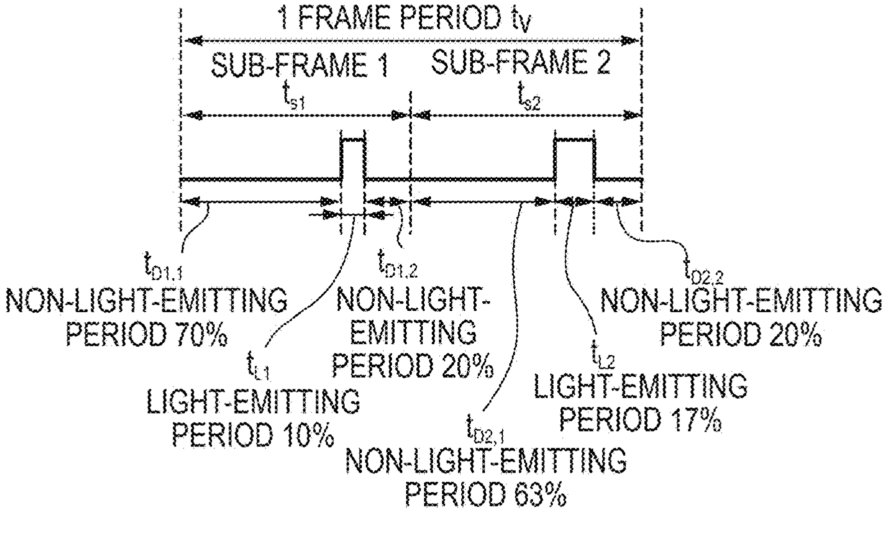
FIG. 15 is a timing chart showing the operation of a display device according to Example 3-1.

In Example 3-1, the refresh rate of the display device 10 is set to 60 Hz, as shown in FIG. 15. One frame period of image data of 60 fps is divided into two sub-frame periods. The controller 20 (light emission controller 31) controls the driver 50 (vertical scanning circuit 13) such that each sub-frame period is formed by a first non-light-emitting period, a light-emitting period, and a second non-light-emitting period. Also, the controller 20 (light emission controller 31) controls the driver 50 (vertical scanning circuit 13) such that the first non-light-emitting period starts at the start of each sub-frame, the light-emitting period starts at the end of the first non-light-emitting period, and the second non-light-emitting period starts at the end of the light-emitting period.

Letting $t_v$ be one frame period, in Example 3-1, $t_{D1,2}+t_{D2,1}=(1/2)t_v*0.20+(1/2)t_v*0.70=0.450t_v$, and $t_{Dn,2}+t_{D1,1}=(1/2)t_v*0.20+(1/2)t_v*0.63=0.415t_v$. Hence, $t_{D1,2}+t_{D2,1}<t_{Dn,2}+t_{D1,1}$.

Thus, the light emission controller 31 can control the driver 50 such that the time from the end of the light-emitting period of the last sub-frame in one frame period to the start of the light-emitting period of the first sub-frame in the next frame (that is, the non-light-emitting period between continuous frame periods) is longer than the time from the end of the light-emitting period of one sub-frame in one frame to the start of the light-emitting period of the next sub-frame (that is, the non-light-emitting period between continuous light-emitting periods in a frame period). At refresh rate=60 Hz, since each frame period is divided into two sub-frame periods, an apparent refresh rate is 120 Hz. Since flickers are rarely recognized in driving at 120 Hz, it can be said that flickers are suppressed in Example 3-1. Also, since the non-light-emitting period between the continuous frame periods is longer than the non-light-emitting period between continuous light-emitting periods in the frame period, a blur that occurs when images are averaged by the after image effect of human vision can be suppressed more.

The present inventor found, as a result of examinations, that when the sub-frame period is formed by the first non-light-emitting period, the light-emitting period, and the second non-light-emitting period, a higher suppression effect can be obtained if the period to change display image data between two continuous frame periods is 3 msec or more. The period to change the display image data between two continuous frame periods is the period from the end of the light-emitting period of the last sub-frame period to the start of light emission in the first sub-frame period of the next frame period. More specifically, if a period in which a vertical synchronization signal between two continuous frame periods is invalid is indicated by $t_{vsoff}$, $t_{Dn,2}+t_{D1,1}+t_{vsoff}$≥3 msec. However, in the display device, since $t_{vsoff}$ is normally in the 0.01 msec order ($t_{vsoff}$<<3 msec), control is preferably performed to satisfy $t_{Dn,2}+t_{D1,1} \geq 3$ msec. In Example 3-1, $t_{D1}=7.5$ msec.

In Example 3-1, if the user is going to change the luminance setting, the setting can be done by the same method as described in Example 1-1. To make the luminance high, it is possible to use a method of increasing the intensity of the light emission pulse, lengthening the light-emitting period tri of the first sub-frame period (in Example 3-1, sub-frame period 1), or lengthening the light-emitting period of the sub-frame period other than the first sub-frame period (in Example 3-1, $t_{L2}$ of sub-frame period 2). The setting may be done by combining these methods. To make the luminance low, it is possible to use a method of decreasing the intensity of the light emission pulse, shortening the light-emitting period $t_{L1}$ of the first sub-frame period (in Example 3-1, sub-frame period 1), or shortening the light-emitting period of the sub-frame period other than the first sub-frame period (in Example 3-1, $t_{L2}$ of sub-frame period 2). The setting may be done by combining these methods. In any case, it is necessary to satisfy $t_{D1,2}+t_{D2,1}<t_{Dn,2}+t_{D1,1}$ to obtain the effect of the third embodiment.

Since the display device according to each of the first to third embodiments can divide one frame into a plurality of sub-frames and adjust the duty ratios of the plurality of sub-frames, the degree of freedom of effective luminance adjustment improves.

The luminance level setting unit 32 may set the luminance level based on image data. More specifically, the luminance level setting unit 32 may calculate the luminance of entire image data, and set the luminance level based on the luminance of the entire image data (that is, supply the luminance level to the light emission pulse generator 33).

A display apparatus with the display device 10 mounted thereon or the display device 10 may include a measuring unit that measures the luminance of the periphery of the display device 10. The controller 20 may determine the duty ratio of each sub-frame period in accordance with the output of the measuring unit (a luminance measured by the measuring unit). According to this configuration, it is possible to improve immediacy of luminance adjustment. If the time from obtaining of information indicating an ambient luminance to adjustment of the luminance is long, followability to an abrupt change of the ambient luminance (for example, in a case where a car enters a tunnel and exits from there or a case where a lighting is turned on/off indoors) is low. For this reason, immediacy of luminance adjustment is required to be high. It is advantageous to determine, by the controller, a duty ratio according to the ambient luminance obtained by the measuring unit and, after the end of the first sub-frame period of a frame period, adjust the duty ratio of the sub-frame period in accordance with the determination.

Example 3-2

Figure 16:
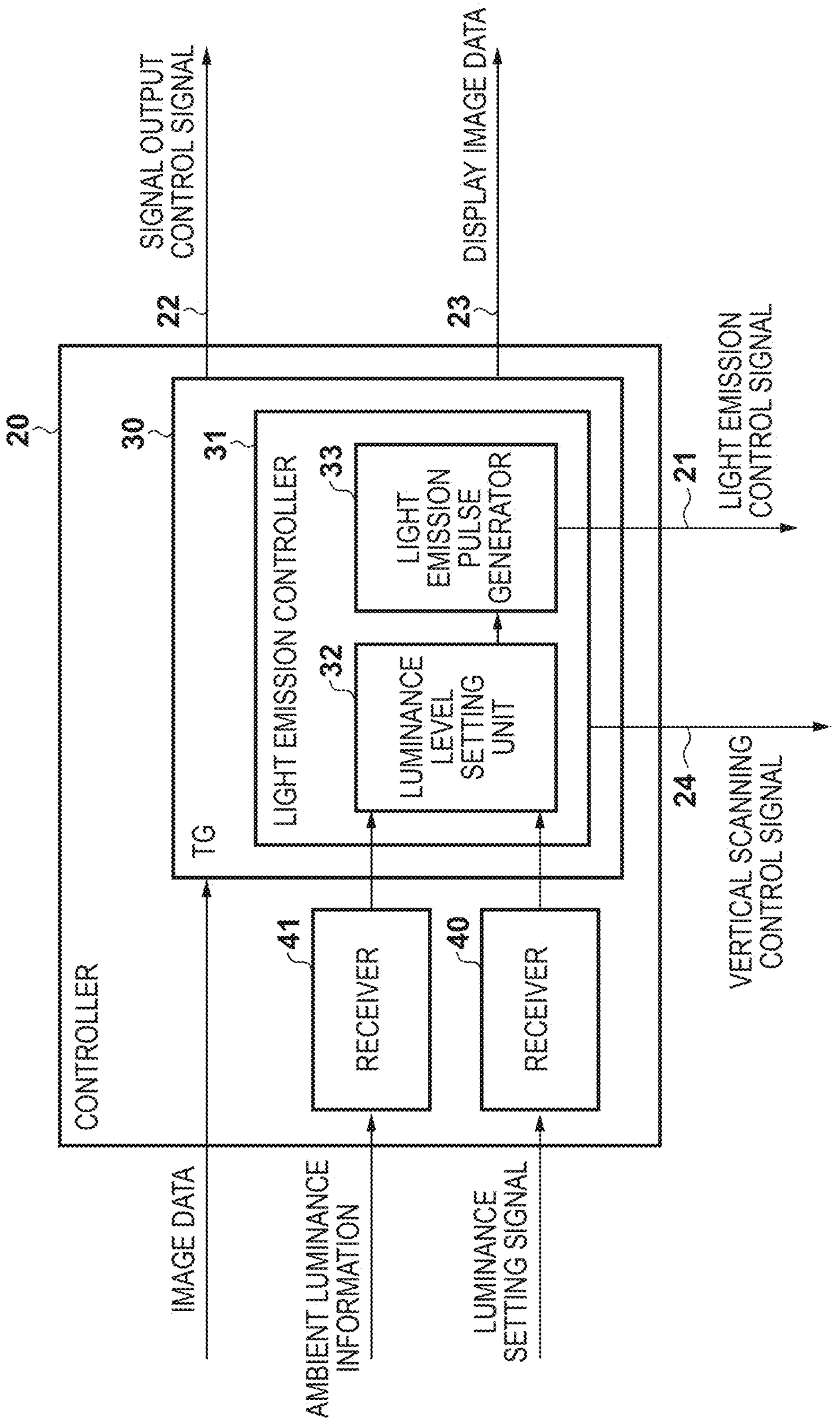
FIG. 16 is a view showing the configuration of the controller of a display device according to Example 3-2.

FIG. 16 shows a configuration in which, in a display apparatus including a measuring unit configured to measure the ambient luminance of a display device 10, a controller 20 receives ambient luminance information. The controller 20 includes a receiver 41 that receives ambient luminance information, receives ambient luminance information that is the information of an ambient luminance measured by the measuring unit, and sends a signal to a light emission controller 31. In accordance with the received luminance information, the light emission controller 31 sets a luminance level independently of luminance setting information provided from a receiver 40 that receives luminance setting information. If both the luminance setting information provided from the receiver 40 and the ambient luminance information provided from the receiver 41 are received, a luminance level setting unit 32 can set a luminance level in accordance with both pieces of information.

Figure 17:
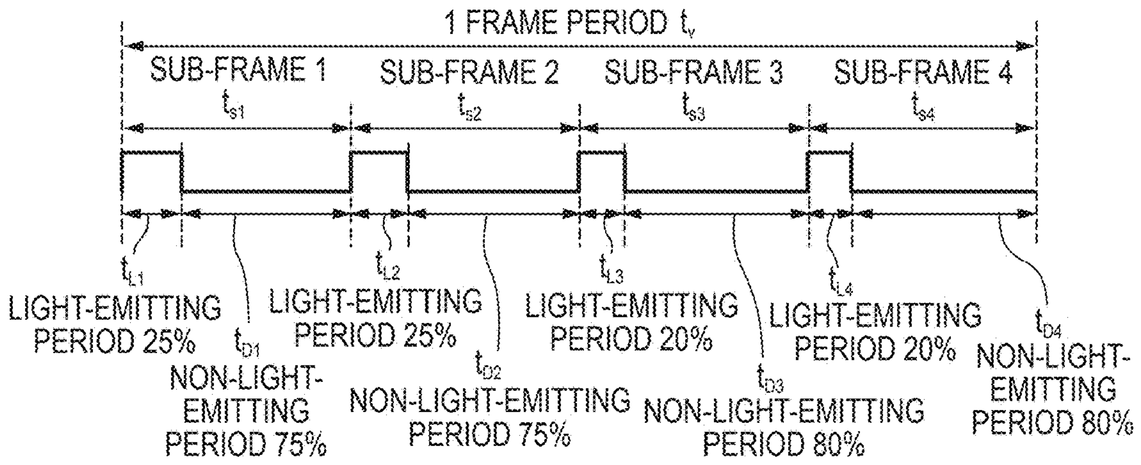
FIG. 17 is a timing chart showing the operation of the display device according to Example 3-2.

FIG. 17 exemplarily shows the operation of Example 3-2. In the example shown in FIG. 17, the light emission controller 31 (luminance level setting unit 32) determines, in accordance with received ambient luminance information, to lower the luminance level (make the display image dark). In this example, the luminance level setting unit 32 can process the received ambient luminance information and lower the luminance level until the end of luminance level period 2. A light emission pulse generator 33 changes the duty ratios of sub-frame periods 3 and 4 in accordance with the setting of the luminance level. Even after the change, the duty ratios are set to satisfy $t_{Ln}<t_{L1}$. Also, since $t_{D4}=3.3$ msec, $t_{Dn} \geq 3$ msec is satisfied. Thus, even if luminance adjustment is performed, suppression of a flicker and suppression of a blur are simultaneously implemented.

Configuration examples and application examples of the above-described display device will exemplarily be described below.

Figure 18A:
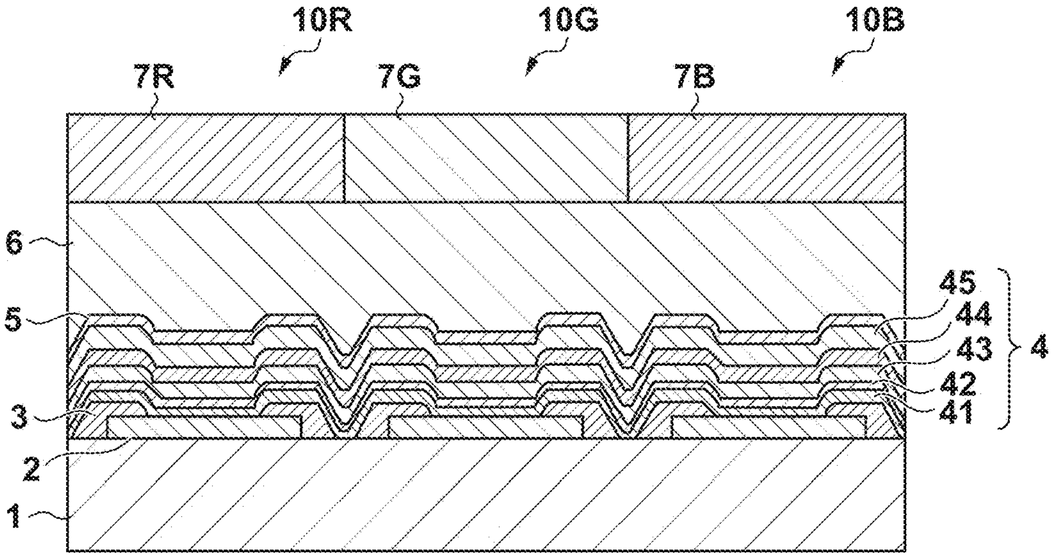
FIGS. 18A and 18B are views exemplarily showing the configuration of a display apparatus according to an embodiment.
Figure 18B:
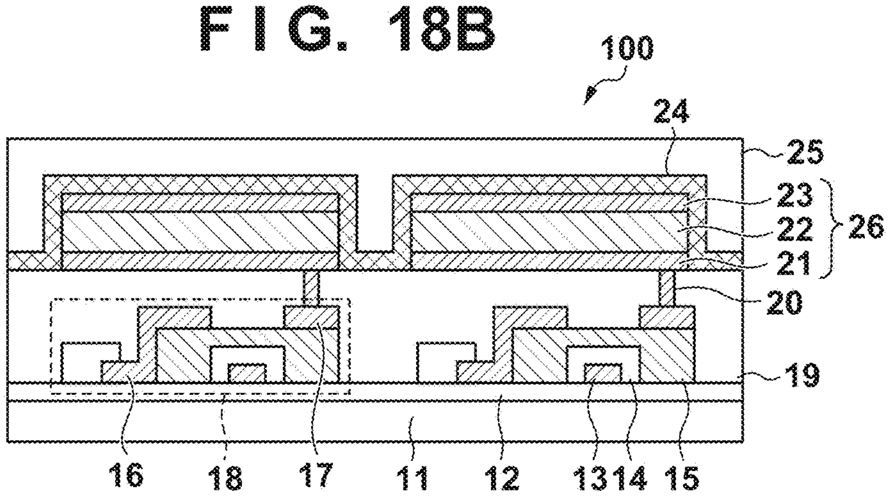

FIGS. 18A and 18B are schematic sectional views showing an example of a display device. FIG. 18A shows an example of a pixel that is a constituent element of the display device 10. The pixel includes sub-pixels 10. The sub-pixels are divided into sub-pixels 10R, 10G, and 10B by emitted light components. The light emission colors may be discriminated by the wavelengths of light components emitted from the light-emitting layers, or light emitted from each sub-pixel may be selectively transmitted or undergo color conversion by a color filter or the like. Each sub-pixel includes a reflective electrode 2 as the first electrode on an interlayer insulating layer 1, an insulating layer 3 covering the end of the reflective electrode 2, an organic compound layer 4 covering the first electrode and the insulating layer, a transparent electrode 5 as the second electrode, a protection layer 6, and a color filter 7.

The interlayer insulating layer 1 can include a transistor and a capacitive element arranged in the interlayer insulating layer 1 or a layer below it. The transistor and the first electrode can electrically be connected via a contact hole (not shown) or the like.

The insulating layer 3 is also called a bank or a pixel isolation film. The insulating layer 3 covers the end of the first electrode, and is arranged to surround the first electrode. A portion where no insulating layer is arranged is in contact with the organic compound layer 4 to form a light-emitting region.

The organic compound layer 4 includes a hole injection layer 41, a hole transport layer 42, a first light-emitting layer 43, a second light-emitting layer 44, and an electron transport layer 45.

The second electrode 5 may be a transparent electrode, a reflective electrode, or a semi-transmissive electrode.

The protection layer 6 suppresses permeation of water into the organic compound layer. The protection layer is shown as a single layer but may include a plurality of layers. Each layer can be an inorganic compound layer or an organic compound layer.

The color filter 7 is divided into color filters 7R, 7G, and 7B by colors. The color filters can be formed on a planarizing film (not shown). A resin protection layer (not shown) may be arranged on the color filters. The color filters can be formed on the protection layer 6. Alternatively, the color filters can be provided on the counter substrate such as a glass substrate, and then the substrate may be bonded.

A display device 100 shown in FIG. 18B can be formed by the display device 10. The display device 100 is provided with an organic light-emitting element 26 and a TFT 18 as an example of a transistor. A substrate 11 of glass, silicon, or the like is provided and an insulating layer 12 is provided on the substrate 11. An active element 18 such as a TFT is arranged on the insulating layer, and a gate electrode 13, a gate insulating film 14, and a semiconductor layer 15 of the active element are arranged. The TFT 18 further includes the semiconductor layer 15, a drain electrode 16, and a source electrode 17. An insulating film 19 is provided on the TFT 18. The source electrode 17 and an anode 21 forming the organic light-emitting element 26 are connected via a contact hole 20 formed in the insulating film.

Note that a method of electrically connecting the electrodes (anode and cathode) included in the organic light-emitting element 26 and the electrodes (source electrode and drain electrode) included in the TFT is not limited to that shown in FIG. 18B. That is, one of the anode and cathode and one of the source electrode and drain electrode of the TFT are electrically connected. The TFT indicates a thin-film transistor.

In the display device 100 shown in FIG. 18B, an organic compound layer is illustrated as one layer. However, an organic compound layer 22 may include a plurality of layers. A first protection layer 24 and a second protection layer 25 are provided on a cathode 23 to suppress deterioration of the organic light-emitting element.

A transistor is used as a switching element in the display device 100 shown in FIG. 18B, but another switching element may be used instead.

The transistor used in the display device 100 shown in FIG. 18B is not limited to a transistor using a single-crystal silicon wafer, and may be a thin-film transistor including an active layer on an insulating surface of a substrate. Examples of the active layer include single-crystal silicon, amorphous silicon, non-single-crystal silicon such as microcrystalline silicon, and a non-single-crystal oxide semiconductor such as indium zinc oxide and indium gallium zinc oxide. Note that a thin-film transistor is also called a TFT element.

The transistor included in the display device 100 shown in FIG. 18B may be formed in the substrate such as an Si substrate. Forming the transistor in the substrate means forming the transistor by processing the substrate such as an Si substrate. That is, when the transistor is included in the substrate, it can be considered that the substrate and the transistor are formed integrally.

The light emission luminance of the organic light-emitting element according to this embodiment can be controlled by the TFT which is an example of a switching element, and the plurality of organic light-emitting elements can be provided in a plane to display an image with the light emission luminances of the respective elements. Note that the switching element according to this embodiment is not limited to the TFT, and may be a transistor formed from low-temperature polysilicon or an active matrix driver formed on the substrate such as an Si substrate. The term "on the substrate" may mean "in the substrate". Whether to provide a transistor in the substrate or use a TFT is selected based on the size of the display unit. For example, if the size is about 0.5 inch, the organic light-emitting element is preferably provided on the Si substrate.

Figure 19:
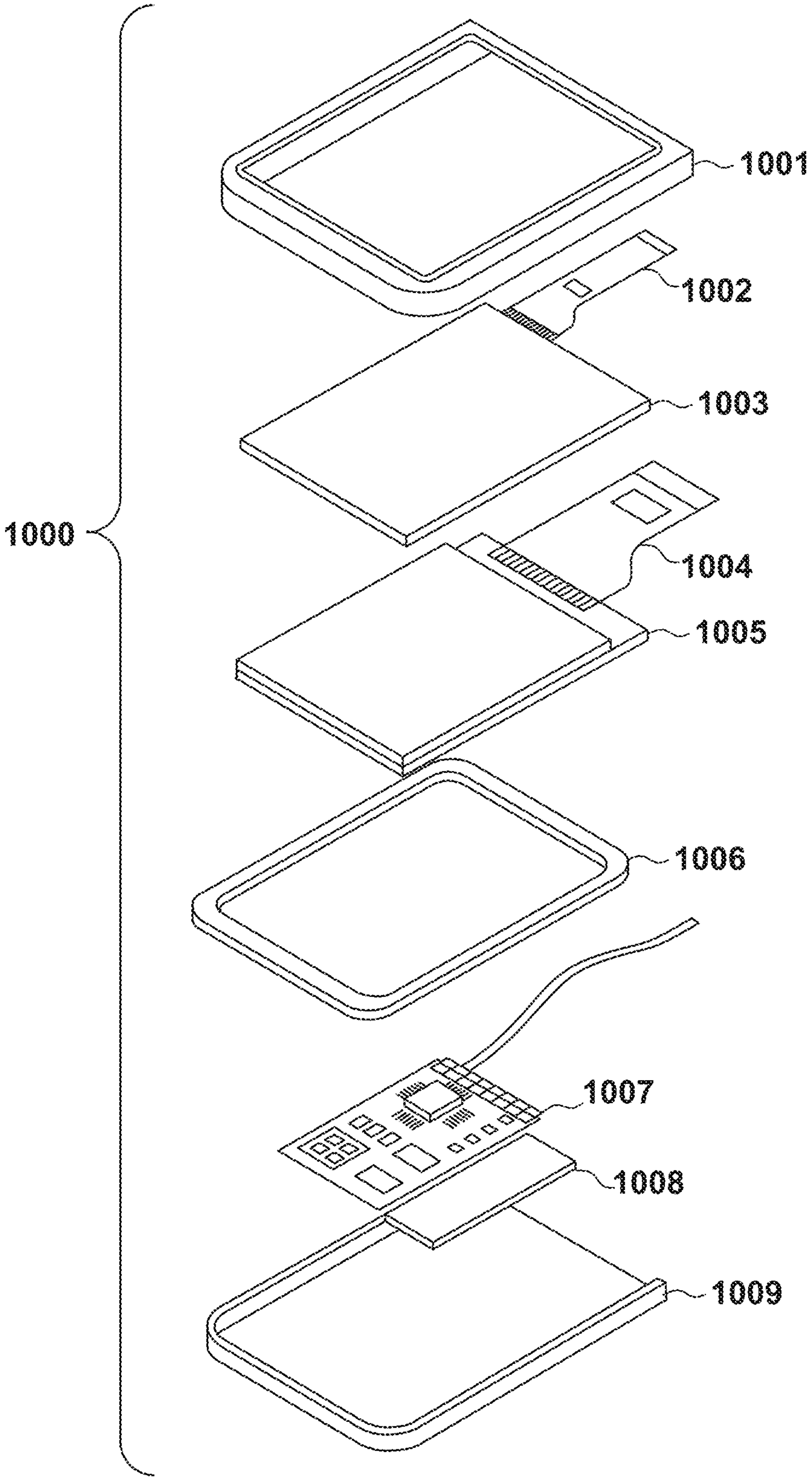
FIG. 19 is a view exemplarily showing the configuration of a display apparatus according to an embodiment.

FIG. 19 is a schematic view showing an example of a display apparatus according to this embodiment. A display apparatus 1000 can include a touch panel 1003, a display panel 1005, a frame 1006, a circuit board 1007, and a battery 1008 between an upper cover 1001 and a lower cover 1009. Flexible printed circuits (FPCs) 1002 and 1004 are respectively connected to the touch panel 1003 and the display panel 1005. Transistors are printed on the circuit board 1007. The battery 1008 is unnecessary if the display apparatus is not a portable apparatus. Even when the display apparatus is a portable apparatus, the battery 1008 may be provided at another position. The display panel 1005 can be formed by the display device 10.

The display apparatus according to this embodiment may include color filters having red, green, and blue colors. The color filters may be arranged using a delta arrangement of red, green, and blue.

The display apparatus according to this embodiment may be used as a display unit of a portable terminal. At this time, the display unit can have both a display function and an operation function. Examples of the portable terminal are a portable phone such as a smartphone, a tablet, and a head mounted display. The display apparatus can include a processing unit that processes information, and the display device 10 configured to display information generated by the information processing unit.

The display apparatus according to this embodiment can be used for a display unit of an image capturing device including an optical unit having a plurality of lenses, and an image sensor for receiving light having passed through the optical unit. The image capturing device can include a display unit for displaying information acquired by the image sensor. In addition, the display unit can be either a display unit exposed outside the image capturing device, or a display unit arranged in the finder. The image capturing device can be a digital camera or a digital video camera.

Figure 20A:
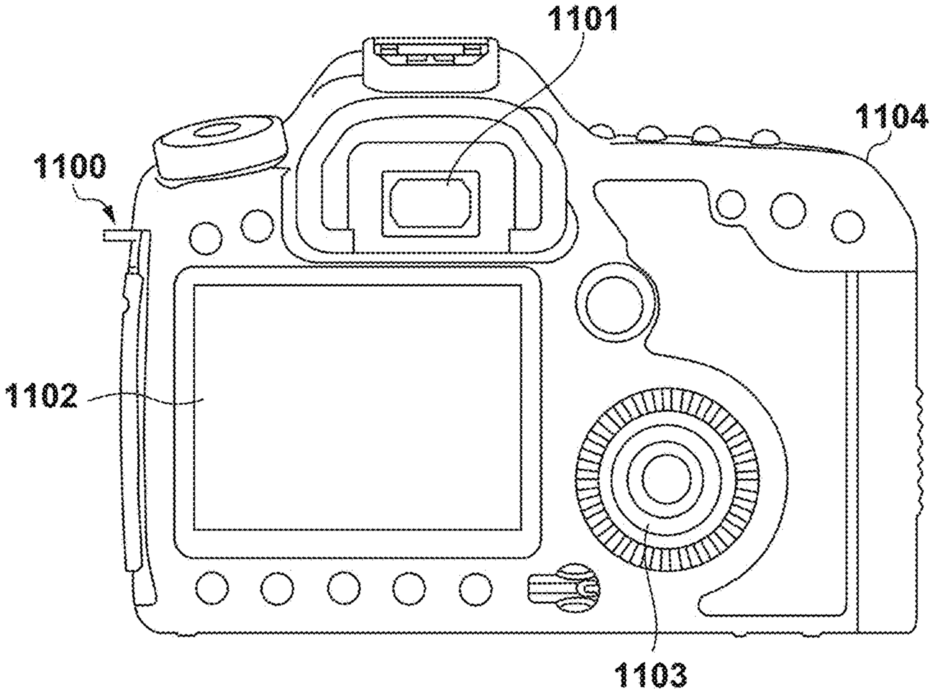
FIGS. 20A and 20B are views exemplarily showing an image capturing apparatus and an electronic apparatus according to an embodiment.

FIG. 20A is a schematic view showing an example of the image capturing device according to this embodiment. An image capturing device 1100 can include a viewfinder 1101, a rear display 1102, an operation unit 1103, and a housing 1104. The viewfinder 1101 can include the display device 10. In this case, the display device can display not only an image to be captured but also environment information, image capturing instructions, and the like. Examples of the environment information are the intensity and direction of external light, the moving velocity of an object, and the possibility that an object is covered with an obstacle.

The image capturing device 1100 includes an optical unit (not shown). This optical unit has a plurality of lenses, and forms an image on an image capturing element accommodated in the housing 1104. The focal points of the plurality of lenses can be adjusted by adjusting the relative positions. This operation can also automatically be performed. The image capturing apparatus may be called a photoelectric conversion apparatus. The photoelectric conversion apparatus can include, as an image capturing method, not a method of sequentially capturing images but a method of detecting the difference from a preceding image, a method of extracting an image from an always recorded image, and the like.

Figure 20B:
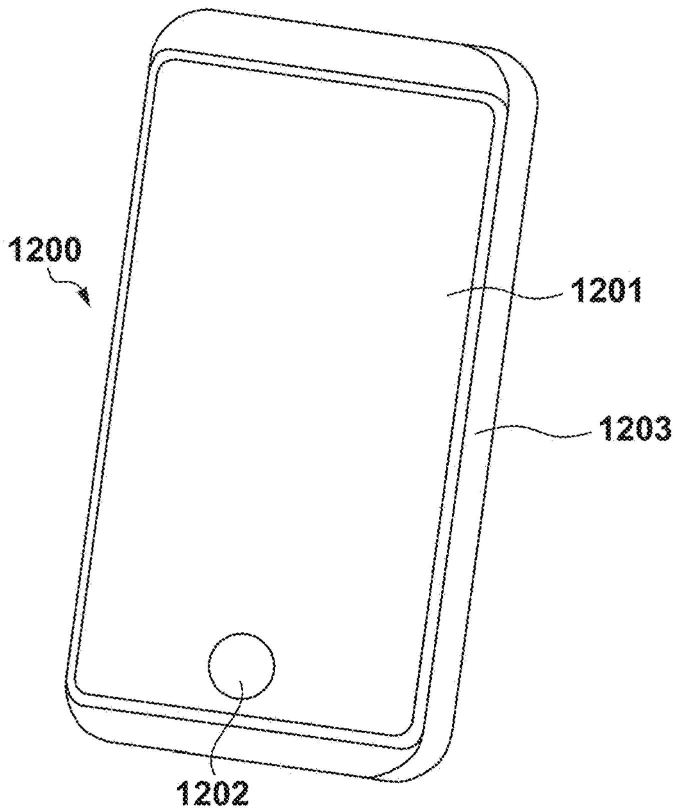

FIG. 20B is a schematic view showing an example of an electronic apparatus according to this embodiment. An electronic apparatus 1200 includes a display unit 1201, an operation unit 1202, and a housing 1203. The housing 1203 can accommodate a circuit, a printed board having this circuit, a battery, and a communication unit. The operation unit 1202 can be a button or a touch-panel-type reaction unit. The operation unit can also be a biometric authentication unit that performs unlocking or the like by authenticating the fingerprint. The portable apparatus including the communication unit can also be regarded as a communication apparatus. The electronic apparatus may also have a camera function by including a lens and an image sensor. An image captured by the camera function is displayed on the display unit. Examples of the electronic apparatus are a smartphone and a laptop computer. The display unit 1201 can be formed by the display device 10.

Figure 21A:
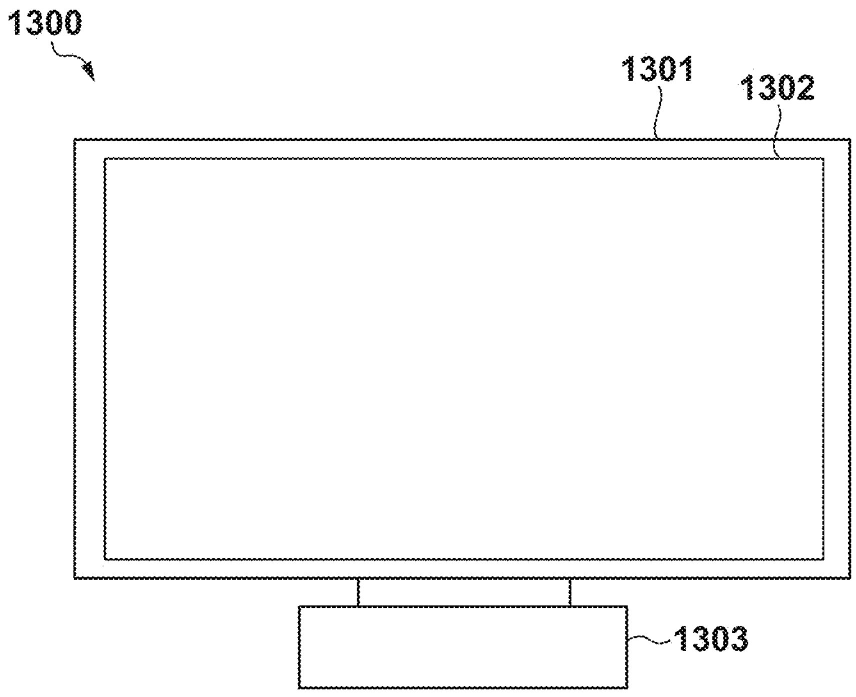
FIGS. 21A and 21B are views exemplarily showing a display apparatus according to an embodiment.
Figure 21B:
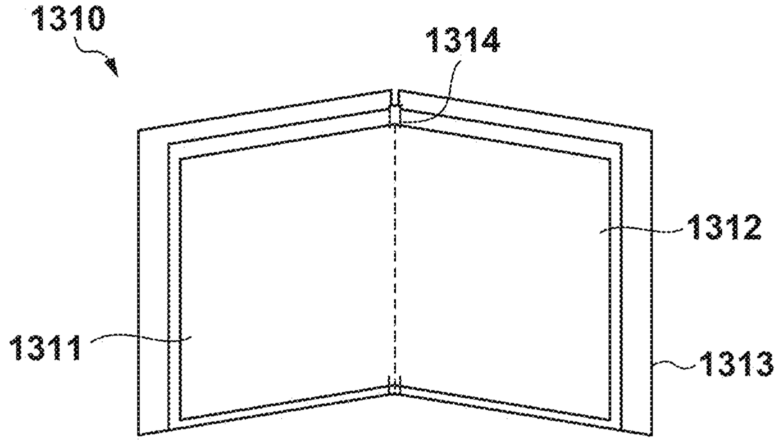

FIGS. 21A and 21B are schematic views showing examples of the display apparatus according to this embodiment. FIG. 21A shows a display apparatus such as a television monitor or a PC monitor. A display apparatus 1300 includes a frame 1301 and a display unit 1302. The display unit 1302 can be formed by the display device 10.

The display apparatus 1300 includes a base 1303 that supports the frame 1301 and the display unit 1302. The base 1303 is not limited to the form shown in FIG. 21A. The lower side of the frame 1301 may also function as the base.

In addition, the frame 1301 and the display unit 1302 can be bent. The radius of curvature in this case can be 5,000 mm (inclusive) to 6,000 mm (inclusive).

FIG. 21B is a schematic view showing another example of the display apparatus according to this embodiment. A display apparatus 1310 shown in FIG. 21B can be folded, and is a so-called foldable display apparatus. The display apparatus 1310 includes a first display unit 1311, a second display unit 1312, a housing 1313, and a bending point 1314. Each of the first display unit 1311 and the second display unit 1312 can be formed by the display device 10. The first display unit 1311 and the second display unit 1312 can also be one seamless display apparatus. The first display unit 1311 and the second display unit 1312 can be divided by the bending point. The first display unit 1311 and the second display unit 1312 can display different images, and the first and second display units can also display one image together.

Application examples of the display device according to each embodiment described above will be described with reference to FIGS. 22A and 22B. The display device can be applied to a system that can be worn as a wearable device such as smartglasses, an HMD, or a smart contact lens. An image capturing display apparatus used for such application examples includes an image capturing apparatus capable of photoelectrically converting visible light and a display apparatus capable of emitting visible light.

Figure 22A:
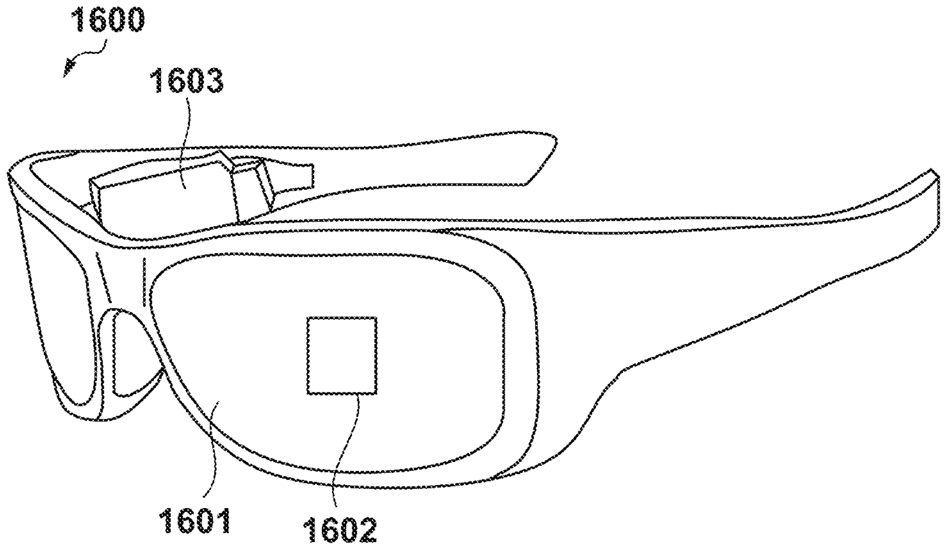
FIGS. 22A and 22B are views exemplarily showing smartglasses according to an embodiment.

Glasses 1600 (smartglasses) according to one application example will be described with reference to FIG. 22A. An image capturing apparatus 1602 such as a CMOS sensor or an SPAD is provided on the surface side of a lens 1601 of the glasses 1600. In addition, the display device 10 can be arranged on the back surface side of the lens 1601.

The glasses 1600 further include a control device 1603. The control device 1603 functions as a power supply that supplies electric power to the image capturing apparatus 1602 and the display apparatus according to each embodiment. In addition, the control device 1603 controls the operations of the image capturing apparatus 1602 and the display apparatus. An optical system configured to condense light to the image capturing apparatus 1602 is formed on the lens 1601.

Figure 22B:
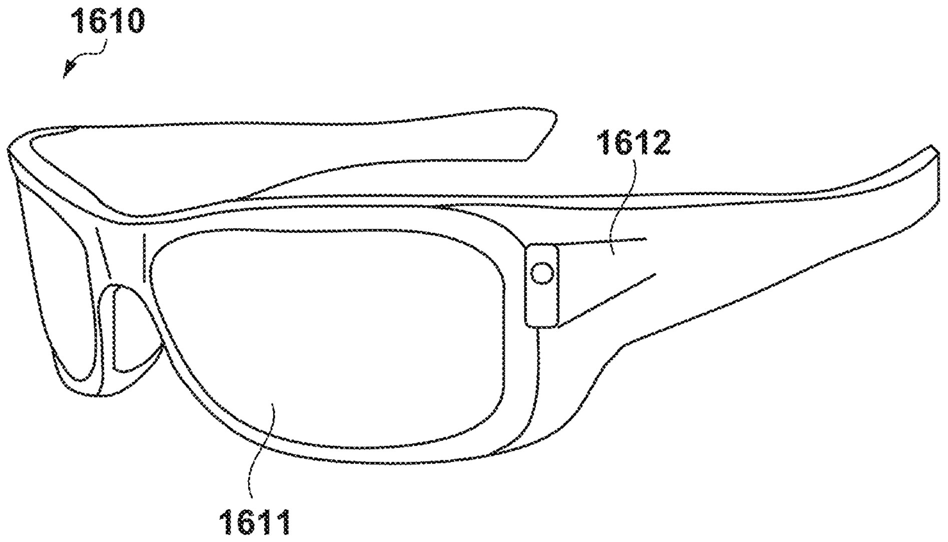

Glasses 1610 (smartglasses) according to one application example will be described with reference to FIG. 22B. The glasses 1610 include a control device 1612. An image capturing apparatus corresponding to the image capturing apparatus 1602 and the display device 10 are mounted on the control device 1612. An optical system configured to project light emitted from the display apparatus in the control device 1612 is formed in a lens 1611, and an image is projected to the lens 1611. The control device 1612 functions as a power supply that supplies electric power to the image capturing apparatus and the display device 10, and controls the operations of the image capturing apparatus and the display apparatus. The control device may include a line-of-sight detection unit that detects the line of sight of a wearer. The detection of a line of sight may be done using infrared rays. An infrared ray emitting unit emits infrared rays to an eyeball of the user who is gazing at a displayed image. An image capturing unit including a light-receiving element detects reflected light of the emitted infrared rays from the eyeball, thereby obtaining a captured image of the eyeball. A reduction unit for reducing light from the infrared ray emitting unit to the display unit in a planar view is provided, thereby reducing deterioration of image quality.

The line of sight of the user to the displayed image is detected from the captured image of the eyeball obtained by capturing the infrared rays. An arbitrary known method can be applied to the line-of-sight detection using the captured image of the eyeball. As an example, a line-of-sight detection method based on a Purkinje image obtained by reflection of irradiation light by a cornea can be used.

More specifically, line-of-sight detection processing based on pupil center corneal reflection is performed. Using pupil center corneal reflection, a line-of-sight vector representing the direction (rotation angle) of the eyeball is calculated based on the image of the pupil and the Purkinje image included in the captured image of the eyeball, thereby detecting the line-of-sight of the user.

The display apparatus according to the embodiment of the present invention can include an image capturing apparatus including a light-receiving element, and control an image displayed on the display apparatus based on the line-of-sight information of the user from the image capturing apparatus.

More specifically, the display apparatus decides a first display region at which the user is gazing and a second display region other than the first display region based on the line-of-sight information. The first display region and the second display region may be decided by the control device of the display apparatus, or those decided by an external control device may be received. In the display region of the display apparatus, the display resolution of the first display region may be controlled to be higher than the display resolution of the second display region. That is, the resolution of the second display region may be lower than that of the first display region.

In addition, the display region includes a first display region and a second display region different from the first display region, and a region of higher priority is decided from the first display region and the second display region based on line-of-sight information. The first display region and the second display region may be decided by the control device of the display apparatus, or those decided by an external control device may be received. The resolution of the region of higher priority may be controlled to be higher than the resolution of the region other than the region of higher priority. That is, the resolution of the region of relatively low priority may be low.

Note that AI may be used to decide the first display region or the region of higher priority. The AI may be a model configured to estimate the angle of the line of sight and the distance to a target ahead the line of sight from the image of the eyeball using the image of the eyeball and the direction of actual viewing of the eyeball in the image as supervised data. The AI program may be held by the display apparatus, the image capturing apparatus, or an external apparatus. If the external apparatus holds the AI program, it is transmitted to the display apparatus via communication.

When performing display control based on line-of-sight detection, it can suitably be applied to smartglasses further including an image capturing apparatus configured to capture the outside. The smartglasses can display captured outside information in real time.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-040190, filed Mar. 14, 2024, which is hereby incorporated by reference herein in its entirety.

What is claimed is:

1. A display device comprising:

a pixel array;

a driver configured to drive the pixel array; and a controller configured to control the driver, wherein the controller controls the driver such that each unit frame period is formed by a plurality of sub-frame periods, and a duty ratio in each sub-frame period is controlled, wherein the controller controls the driver such that each sub-frame period is formed by a first non-light-emitting period, a light-emitting period, and a second non-light-emitting period, wherein the first non-light-emitting period starts at a start of each sub-frame period, the light-emitting period starts at an end of the first non-light-emitting period, and the second non-light-emitting period starts at the end of the light-emitting period, and wherein when lengths of the first non-light-emitting period, the light-emitting period, and the second non-light-emitting period in a kth (k is 1 to n) sub-frame are defined as $t_{Dk,1}$, $t_{Lk}$, and $t_{Dk,2}$, respectively, the controller controls the driver to satisfy $$t_{D1,2} + t_{D2,1} < t_{Dn,2} + t_{D1,1}.$$

2. The device according to claim 1, wherein the plurality of sub-frame periods have time lengths equal to each other.

3. The device according to claim 1, wherein the controller controls the driver such that the lengths $t_{Dk,1}$ in k=1 to n−1 equal each other, the lengths $t_{Lk}$ in k=1 to n−1 equal each other, and the lengths $t_{Dk,2}$ in k=1 to n−1 equal each other.

4. The device according to claim 3, wherein the controller controls the driver such that $t_{D1,2}+t_{D2,1}$ is not less than 3 msec.

5. The device according to claim 1, wherein the driver supplies to the pixel array a signal having a voltage according to a luminance signal.

6. The device according to claim 1, wherein the driver supplies to the pixel array a signal once in each unit frame period.

7. The device according to claim 6, further comprising a measuring unit configured to measure a luminance on the periphery of the pixel array, wherein the controller determines the duty ratio of each sub-frame period in accordance with an output of the measuring unit.

8. The device according to claim 7, wherein after the duty ratio is determined in accordance with the output of the measuring unit, the controller changes the duty ratios of remaining sub-frame periods to the determined duty ratio from the end of the first sub-frame period in the unit frame.

9. A display apparatus comprising:

an information processing unit configured to process information; and a display device according to claim 1, which is configured to display information generated by the information processing unit.

10. A photoelectric conversion apparatus comprising:

an optical unit including a plurality of lenses;

an image sensor configured to receive light having passed through the optical unit; and a display unit configured to display an image, wherein the display unit includes a display device according to claim 1, which is configured to display an image captured by the image sensor.

* * * * *